United States Patent
Ji et al.

(10) Patent No.: US 9,654,209 B2
(45) Date of Patent: May 16, 2017

(54) LOW COST SECURE ROADM BRANCHING UNIT WITH REDUNDANCY PROTECTION

(71) Applicant: NEC Laboratories America, Inc., Princeton, NJ (US)

(72) Inventors: Philip Nan Ji, Cranbury, NJ (US); Ting Wang, West Windsor, NJ (US); Ryuji Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/090,642

(22) Filed: Apr. 5, 2016

(65) Prior Publication Data

US 2016/0301467 A1 Oct. 13, 2016

Related U.S. Application Data

(60) Provisional application No. 62/144,575, filed on Apr. 8, 2015.

(51) Int. Cl.
| | |
|---|---|
| *H04B 10/00* | (2013.01) |
| *H04B 10/032* | (2013.01) |
| *H04J 14/02* | (2006.01) |
| *H04B 10/25* | (2013.01) |
| *H04Q 11/00* | (2006.01) |

(52) U.S. Cl.
CPC ....... *H04B 10/032* (2013.01); *H04B 10/2503* (2013.01); *H04J 14/0204* (2013.01); *H04J 14/0205* (2013.01); *H04J 14/0212* (2013.01); *H04J 14/0216* (2013.01); *H04J 14/0297* (2013.01); *H04Q 11/0005* (2013.01); *H04Q 2011/0043* (2013.01)

(58) Field of Classification Search
USPC .................................................. 398/1–8, 45
See application file for complete search history.

(56) References Cited

U.S. PATENT DOCUMENTS

| | | | | |
|---|---|---|---|---|
| 6,023,359 A | * | 2/2000 | Asahi ................... | H04B 10/032 398/1 |
| 6,195,186 B1 | * | 2/2001 | Asahi ................. | H04J 14/0201 398/5 |

(Continued)

*Primary Examiner* — Agustin Bello
(74) *Attorney, Agent, or Firm* — Joseph Kolodka

(57) ABSTRACT

A communication system includes a primary module with: first trunk and branch input and output ports, each coupled to first in/out couplers, the first in/out couplers coupled to first circulators, and the circulators in turn coupled to first central couplers; second trunk branch input and output ports, each coupled to second in/out couplers, each of second in/out couplers coupled to second circulators; and first and second bidirectional wavelength-selective switches (WSSes) coupled to the first central couplers. The system also includes a secondary module with first trunk and branch input and output ports, each coupled to first in/out couplers, the first in/out couplers coupled to third circulators, and the circulators in turn coupled to second central couplers; second trunk branch input and output ports, each coupled to second in/out couplers, each of second in/out couplers coupled to fourth circulators, and third and fourth bidirectional wavelength-selective switches (WSSes) coupled to the second central couplers. The system further includes one or more 2×2 switches coupling the primary module WSS outputs with the secondary module WSS outputs.

20 Claims, 18 Drawing Sheets

(56) References Cited

U.S. PATENT DOCUMENTS

| | | | |
|---|---|---|---|
| 6,222,653 B1* | 4/2001 | Asahi | H04J 14/0283 398/4 |
| 6,579,018 B1* | 6/2003 | Li | H04J 14/0212 398/4 |
| 6,587,235 B1* | 7/2003 | Chaudhuri | H04B 10/032 370/216 |
| 6,771,852 B2* | 8/2004 | Hemenway | H04J 14/0295 385/17 |
| 6,950,215 B2* | 9/2005 | Fant | G02B 6/3562 359/16 |
| 7,233,738 B2* | 6/2007 | Kerfoot, III | H04J 14/029 398/10 |
| 7,274,873 B2* | 9/2007 | Bortz | H04J 14/02 398/45 |
| 7,613,391 B2* | 11/2009 | Tajima | G02B 6/3562 398/145 |
| 7,764,881 B2* | 7/2010 | Aoki | H04Q 11/0005 398/19 |
| 7,826,744 B2* | 11/2010 | Miyata | H04B 10/27 398/58 |
| 8,111,995 B2* | 2/2012 | Wisseman | G02B 6/2931 398/48 |
| 8,126,330 B2* | 2/2012 | Wisseman | H04J 14/0212 398/2 |
| 8,526,814 B2* | 9/2013 | Uehara | H04Q 11/0005 398/50 |
| 8,737,776 B2* | 5/2014 | Boduch | H04J 14/0204 385/15 |
| 8,849,113 B2* | 9/2014 | Ooi | H04Q 11/0005 385/16 |
| 8,849,115 B2* | 9/2014 | Blair | H04J 14/0206 398/49 |
| 8,923,667 B2* | 12/2014 | Cohen | G02B 6/351 385/16 |
| 9,106,983 B2* | 8/2015 | Ji | H04Q 11/0005 |
| 9,160,478 B2* | 10/2015 | Roorda | H04J 14/0212 |
| 9,270,405 B2* | 2/2016 | Blair | H04J 14/0206 |
| 9,429,712 B2* | 8/2016 | Martinelli | G02B 6/3546 |
| 9,548,834 B2* | 1/2017 | Roorda | H04J 14/0212 |
| 2002/0186434 A1* | 12/2002 | Roorda | H04J 14/0204 398/82 |
| 2002/0196495 A1* | 12/2002 | Grasso | H04J 14/0206 398/82 |
| 2003/0025956 A1* | 2/2003 | Li | H04J 14/0212 398/5 |
| 2003/0128978 A1* | 7/2003 | Hemenway | H04J 14/0295 398/2 |
| 2003/0185566 A1* | 10/2003 | Nishi | H04J 14/0291 398/56 |
| 2004/0161232 A1* | 8/2004 | Kerfoot, III | H04J 14/029 398/5 |
| 2004/0208549 A1* | 10/2004 | Rutledge | H04J 14/0227 398/50 |
| 2006/0210266 A1* | 9/2006 | Aoki | H04Q 11/0005 398/19 |
| 2006/0216029 A1* | 9/2006 | Vassilieva | H04J 14/0204 398/83 |
| 2007/0172240 A1* | 7/2007 | Terai | H04J 14/02 398/83 |
| 2007/0269211 A1* | 11/2007 | Doerr | H04J 14/0209 398/49 |
| 2007/0286605 A1* | 12/2007 | Feuer | H04J 14/0204 398/83 |
| 2008/0031627 A1* | 2/2008 | Smith | G02B 6/2931 398/83 |
| 2008/0292310 A1* | 11/2008 | Li | H04B 10/032 398/5 |
| 2009/0142058 A1* | 6/2009 | Schimpe | H04J 14/0204 398/50 |
| 2009/0232492 A1* | 9/2009 | Blair | H04J 14/0206 398/5 |
| 2010/0027995 A1* | 2/2010 | Farley | G02B 6/351 398/49 |
| 2010/0034532 A1* | 2/2010 | Ghelfi | H04J 14/0204 398/2 |
| 2010/0129082 A1* | 5/2010 | Zhong | H04J 14/0204 398/83 |
| 2010/0150558 A1* | 6/2010 | Wisseman | H04J 14/0212 398/79 |
| 2010/0260500 A1* | 10/2010 | Ji | H04J 14/0212 398/50 |
| 2011/0116790 A1* | 5/2011 | Sakauchi | H04J 14/0204 398/5 |
| 2011/0286746 A1* | 11/2011 | Ji | H04J 14/0204 398/83 |
| 2012/0114332 A1* | 5/2012 | Zhang | H04J 14/0204 398/48 |
| 2012/0170928 A1* | 7/2012 | Tanaka | H04B 10/2557 398/28 |
| 2012/0189301 A1* | 7/2012 | Ghiggino | H04J 14/0227 398/34 |
| 2013/0259475 A1* | 10/2013 | Ji | H04Q 11/0005 398/48 |
| 2014/0294383 A1* | 10/2014 | Caviglia | H04J 14/0294 398/48 |
| 2014/0348504 A1* | 11/2014 | Blair | H04J 14/0206 398/49 |
| 2015/0086191 A1* | 3/2015 | Boduch | H04J 14/0297 398/2 |
| 2016/0036549 A1* | 2/2016 | Roorda | H04J 14/0212 398/49 |
| 2016/0301467 A1* | 10/2016 | Ji | H04B 10/032 |
| 2017/0019168 A1* | 1/2017 | Menard | G02B 6/29395 |

* cited by examiner

LOW COST SECURE ROADM BRANCHING UNIT WITH REDUNDANCY PROTECTION

This application claims priority to Provisional Application 62/144,575 filed Apr. 8, 2015, the content of which is incorporated by reference.

BACKGROUND

This application is related to a ROADM system.

Submarine optical networks form the backbone of global communication networks. Submarine optical networks usually consist of main trunks that connect the trunk terminals, which are point-to-point cable links with in-line optical amplifiers to boost the signal power, and branch path that connect to other branch terminals. A branching unit (BU) is a network element that splits the signal between the main trunk and the branch path and vice versa. This allows the signals from different paths to share the same fiber, instead of installing dedicate fiber pairs for each link. The signal splitting and combining function of the BU is usually performed optically, therefore the BU has the similar function as the optical add/drop multiplexer (OADM) in the terrestrial WDM networks. FIG. 1 shows the schematic of existing submarine communication system that consists of two trunk terminals, one branch terminal and one BU that links the main trunk with the branch path. Bidirectional fiber transmission is illustrated. Note that there are there are two pairs of fiber between the BU and the branch terminal. One pair is used to connect Trunk Terminal 1 to the branching terminal, while the second pair is used between Trunk Terminal 2 and the branch terminal. This allows the reuse of the same wavelengths in the TT1-BT path and the TT2-BT path.

Typically, a BU consists of two subcomponents, one is called power switched branching unit (PSBU), and the other is an OADM unit. It's illustrated in FIG. 2. The PSBU is inserted in the main trunk, and has several 1×2 switches. It can decide whether there will be add/drop to a branch terminal from this point. If there is no branching path connected, or if add/drop to the branch terminal is not required, the switches will send the signals directly along the trunk path (FIG. 2(a)). This is useful to pre-set a branching point for future use.

If add/drop is required, and OADM unit is connected to the PSBU, and the 1×2 switches in the PSBU are switched to send the signal to/from the OADM unit, as shown in FIG. 2(b). Inside the OADM unit, a wavelength add/drop subsystem connects the 4 fiber pairs (or 3 pairs, if there's only one branch fiber pair), and performs wavelength add/drop function according to the network requirement. These 4 fiber pairs and the respective ports are named A, B, C, and D in this document, where ports A and B are connected to the main trunk through the PSBU, and ports C and D are connected to the branch terminal. There are optical signal monitors at each input port, and optical amplifiers at the input and output of each port. The 4-input-4-output OADM unit can be redrawn as FIG. 3.

The key task of designing a BU is to design the optical add/drop subsystem. Therefore in the remaining sections of this document, we ignore the components that are not related to switching or reconfiguration (such as amplifiers, power monitors, and power supplies), and focus on the optical add/drop subsystem (OADM subsystem) design.

Conventional BU and the submarine network have fixed, pre-determined wavelength arrangement, therefore no reconfiguration is required. However, the traffic in the global communication network is becoming more dynamic as Internet-based traffic becomes more dominating. Therefore the wavelength reconfigurability is required for the next generation submarine network, with reconfigurable BU as the key enabling element.

Various submarine network BU architectures have been proposed to add reconfigurability and to achieve reconfigurable optical add/drop multiplexing (ROADM) function between the main trunk and branch path in submarine network. The OADM unit becomes a ROADM unit, and the OADM subsystem becomes the ROADM subsystem. These architectures and techniques include using tunable filters, filter array with switch, wavelength-selective switches (WSS), 2×2 switches in bidirectional demultiplexer-switch-multiplexer (DSM) system, 1×2 switches in split-and-select DSM system, 1:2 interleaver with source tuning, 2:2 interleaver with source tuning, etc. Ref [1] describes these architectures, and compares their various features, including reconfigurability, number of branch fiber pairs, latching capability, and broadcasting feature, etc. It also contains more detail reference for each architecture.

Among these architectures, WSS-based architecture provides the highest level of reconfigurability ($2^K$ configurations can be achieved, where K is the number of WDM channels at the narrowest channel spacing acceptable in the system). (In comparison, the tunable filter-based architectures can deliver K configurations; the 2×2 switch-based architecture can deliver $2^B$ configurations, where B is the number of wavebands, which is a few times smaller than K; and the interleaver-based architecture can deliver $2^{K/2}$ configurations if there's only one branching split, and fewer configurations at higher split numbers.)

WSS is also the key optical component for wavelength switching in the terrestrial ROADM nodes, it has reached technology maturity in the past decade and is widely available commercially by multiple key optical component vendors, therefore it is most likely that WSS-based architecture will also be the main solution for submarine reconfigurable branching unit design. This invention is targeting the WSS-based ROADM branching unit. There are 3 key requirements for submarine branching unit design:

1. Reliable: Due to the physical location and environment (deep sea, ocean bottom), the required time and effort to identify fault and to repair damages in submarine networks is much greater than in the terrestrial network. Therefore the reliability of the branching unit equipment is very important. Several measures are taken to address the reliability issue. For example, submarine-grade devices are used, these devices have low Failure in Time (FIT) rate (which is the number of failures that can be expected in one billion device-hours of operation). Also, it's desirable to use only passive device or device with latching feature (which means that the switches will maintain their switching setting even after the power is turned off or cut). Since most of the reconfigurable BU require active switches to provide reconfigurability (except very few examples such as in [2] where the reconfigurability is controlled at the terminal node), switches with latching feature is highly desirable. However, despite technology proposals such as [3], latching WSS is still not commercially available yet. Therefore another step to increase the BU equipment's reliability is to add redundancy, so that when part of the hardware fail, the BU can maintain all or partial functions.

2. Security: Secure data delivery is another important issue in submarine optical network design. Since submarine networks usually connect multiple countries, the possibility of a terminal (country) receiving non-designated data between other terminals (countries) is a serious security risk and should be prevented. This is even more critical since most submarine network is owned by a consortium of multiple companies and organizations, with ownership distributed among different countries. It is unlikely for a single country or a single company to manage the entire network and control the security setting, especially since the hardware are located at each participating country. Secure data delivery means that only the intended channels will reach each destination terminal (no matter it is a branch terminal or trunk terminal), and thus the data and information carried in each WDM channel cannot be received at unintended terminal.

3. Low cost: Due to the fact that high reliability submarine-grade devices are much more costly than regular device, and due to other submarine network-specific restrictions and requirements (such as long transmission distance, limited electrical power supply and limited space), the submarine branching unit hardware is more expensive than terrestrial ones. Therefore a design requirement is to keep the cost down as much as possible while meeting the other requirements. In reconfigurable branching unit, the most costly device is the WSS. Therefore keeping the number of WSS to the minimum is one of the design goals. For example, in the bidirectional, 2-branching-pair OADM unit shown in FIG. 3, a target is that the total number of WSS does not exceed 4 (one per path). This will also reduce the electrical power requirement and hardware footprint, which are both scarce in branching unit, it will also reduce control complexity, which leads to better reliability. These are all beneficial to branching unit equipment.

Since all these 3 requirements are important, they need to be met concurrently. However, it is challenging to satisfy all these requirements at the same time. For example, providing redundancy requires additional backup hardware, this is in contradiction to the requirement to keep the hardware cost low. In another example, having secure data delivery means that wavelength-selective device (such as WSS) should be used instead of passive splitting (broadcasting) device (such as optical splitter), but the cost of WSS is more costly then splitter. This invention is aimed at addressing this challenge, namely to meet all these requirements concurrently.

Since the ROADM subsystems in most submarine branching units are 4-input-4-output ROADM (such as in FIG. 3, with full reconfigurability), the target of the ROADM subsystem design can be described more specifically as: Besides meeting the fundamental requirement of providing full reconfigurability through using WSS, the 4-input-4-output ROADM BU should satisfy the following 3 requirements: (A) There are only up to 4 WSS devices in the ROADM unit; (B) When up to 2 WSS fail, the ROADM unit can maintain all the switching (add/drop/through) functions (i.e. with redundancy); (C) Secure data delivery can be maintained at all time, even during device failures. In this invention, this configuration and target is addressed, however the principle can be applied to other configurations (such as 3-input-3-output ROADM).

FIG. 4 shows the most common configuration of 4-input-4-output WSS-based ROADM subsystem. At each input, an optical splitter is used to split the signal to two paths, one for the opposite trunk terminal, the other for the branch terminal. At each output, a WSS is used to select only the appropriate signal for the destination terminal, therefore it achieves both full reconfigurability and secure data delivery functions. The 4-WSS limit is also satisfied. However, if any single WSS fails, the ROADM function cannot be fully maintained.

A similar configuration is called switch-coupler (SC) configuration, as shown on FIG. 5, where the WSS's are placed at the input end (1×2 WSS's, instead of 2×1 WSS's), and the optical couplers (same device as optical splitters) are placed at the output end. This is the same configuration as in FIG. 8 of Ref [1]. This configuration has the same feature as the one on FIG. 4: full reconfigurability, secure data delivery, no more than 4 WSS, but cannot maintain ROADM function when any WSS fails.

Therefore it can be noticed that the main limitation of the current ROADM design is that it cannot maintain ROADM function during WSS failure. In other words, providing redundancy protection is a key feature to be added. And it has to be done without requiring additional WSS hardware and without sacrificing secure data delivery feature.

One conventional design adds redundancy is to use 2×1 switches and additional fiber connections, as shown on FIG. 6. Firstly, there is an additional splitter at the input from Trunk Terminal A. The input signal is split into two paths, one is the original path similar to FIG. 4, the other is sent to Switch 2 for redundancy purpose. When WSS 1 fails, Switch 1 is set so that the B output takes signal from WSS 2 (which is reconfigured accordingly to provide traffic to Trunk Terminal B), and Switch 2 is also set to take the input A signal from the redundancy splitter for output to Branch Terminal D. If WSS 2 fails, WSS 1 and Switch 1 remain unchanged to provide traffic for Trunk Terminal B, but Switch 2 is switched to take the input A signal from the redundancy splitter for output to Branch Terminal D. Similar protection is used for the section in red for WSS 3 and WSS 4.

While being able to provide redundancy during single WSS failures or some cases of simultaneous two WSS failure (one from WSS1 and WSS2, and one from WSS3 and WSS4), this solution cannot provide traffic security to branch terminal during WSS failure, since the traffic to the relevant branch terminal comes from the input splitter from the trunk terminal and does not go through the selection/filtering process of WSS. Also it cannot handle the case when both WSS1 and WSS2 fail at the same time, or when both WSS3 and WSS4 fail at the same time.

Another conventional design uses additional 4×1 WSS as well as four optical splitters, two 2×2 switches, two 2×1 switches, and one 1×2 switches, as shown on FIG. 7. All input signals are split into two paths, one normal working path and one for backup. The 4×1 WSS works with other optical switches to provide WSS function in case one of the four original WSS fails. The advantage of this design is that it can maintain traffic security during single WSS failure. However, it requires additional WSS (and 4×1 WSS is usually more costly than 2×1 WSS), and it cannot handle more than one WSS failure at a time.

SUMMARY

A communication system includes a primary module with: first trunk and branch input and output ports, each coupled to first in/out couplers, the first in/out couplers coupled to first circulators, and the circulators in turn coupled to first central couplers; second trunk branch input and output ports, each coupled to second in/out couplers, each of second in/out couplers coupled to second circulators; and first and second bidirectional wavelength-selective switches (WSSes) coupled to the first central couplers. The system also includes a secondary module with first trunk and branch input and output ports, each coupled to first in/out couplers, the first in/out couplers coupled to third circulators, and the circulators in turn coupled to second central couplers; second trunk branch input and output ports, each coupled to second in/out couplers, each of second in/out couplers coupled to fourth circulators, and third and fourth bidirectional wavelength-selective switches (WSSes) coupled to the second central couplers. The system further includes one or more 2×2 switches coupling the primary module WSS outputs with the secondary module WSS outputs.

Implementations of the system can use optical circulators to perform bidirectional operation to save WSS requirement, so that the spared WSS can provide redundancy protection. Also, it uses small scale optical switches to allow the sharing of protection hardware among different paths, therefore any 2 simultaneous failures can be handled.

Advantages of the system may include one or more of the following. The ROADM subsystem design enables low cost ROADM BU, while delivering full reconfigurability, redundancy for protection, and secure data delivery. Therefore it is a low cost, fully functional, and high reliability solution. Some features of the exemplary design include:

Low cost (only require four 1×2 WSS's)
Allows full reconfigurability
Secure data delivery at all paths
Reuse of dummy light (not requiring light source in the BU to generate dummy light for the outgoing links)
Redundancy protection (for up to any 2 simultaneous WSS failures, all ROADM functions and secure data delivery feature are maintained)

DESCRIPTION (1) Design

Figure 8:
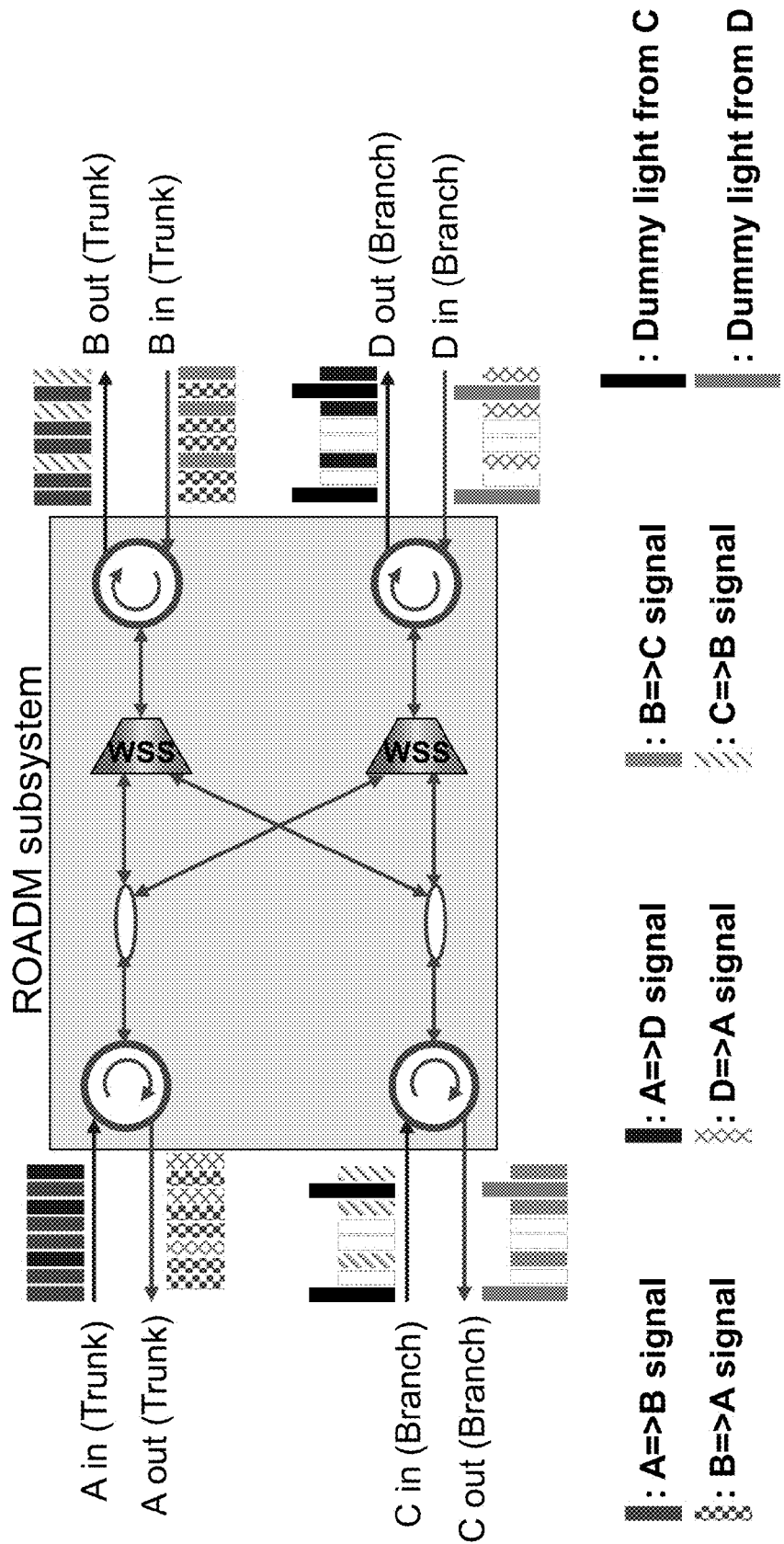
FIG. 8 shows an exemplary bidirectional WSS-based ROADM subsystem.

The exemplary ROADM subsystem architecture is shown on FIG. 8. It uses the bidirectional operation feature of WSS, and the unidirectional transmission feature of 3-port optical circulator. The detailed operation principle and features are described in [4]. By using such configuration, two WSS's are sufficient for the 4-input-4-output ROADM subsystem. It provides full reconfigurability for all paths, and offer secure data delivery feature. However, it does not provide any redundancy protection feature, and since each WSS is used for two paths simultaneously (through bidirectional operation), the failure of each WSS will lead to the failure of two paths, which is half of the BU connections. This is a significant issue for submarine communication, since it will affect large amount of inter-continental traffic and is difficult to repair. In this invention, the redundancy feature is added while maintaining the benefits of this architecture.

(2) Components

Figure 9:
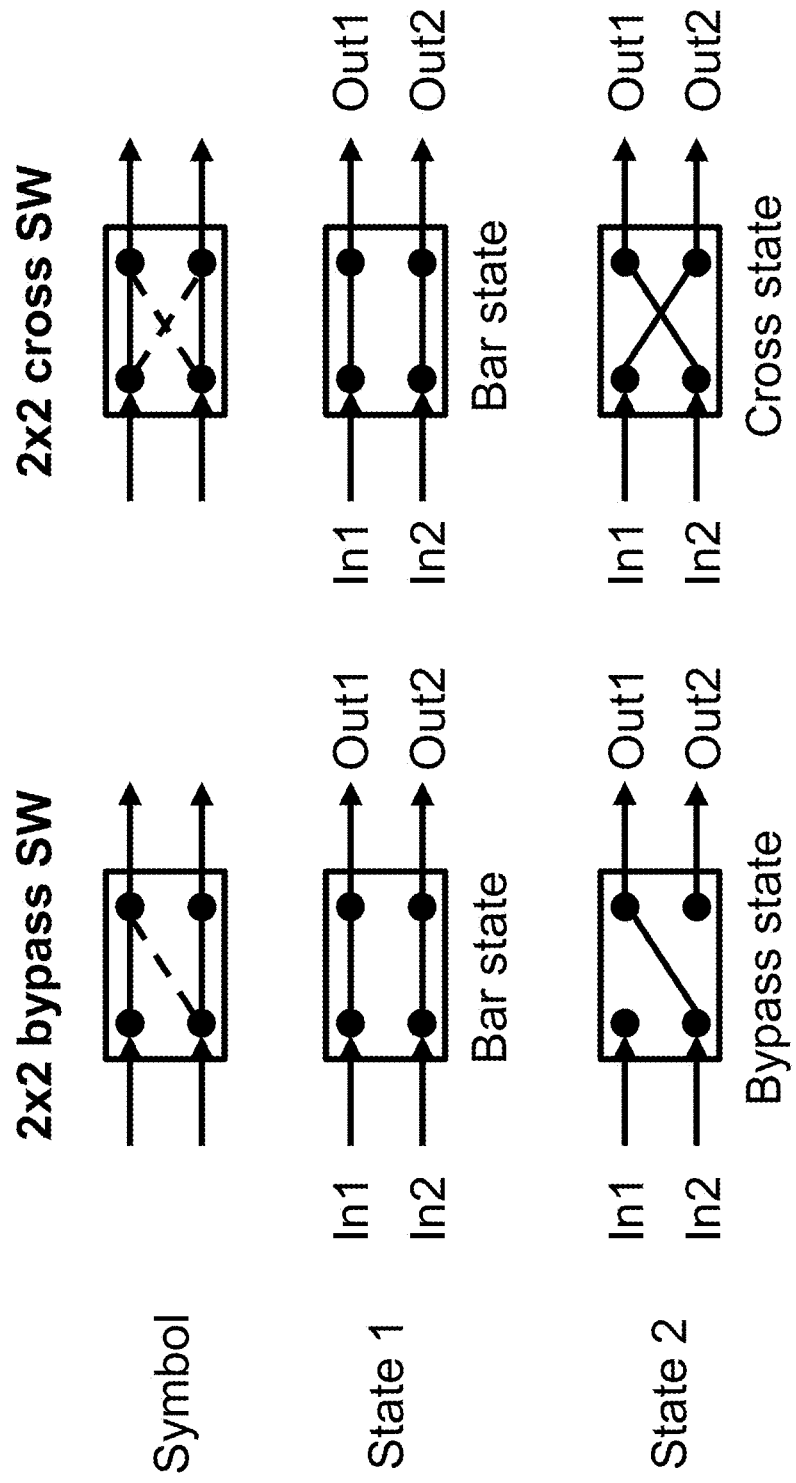
FIG. 9 shows two exemplary types of 2×2 optical switches.

Besides the components used in the previous architecture shown on FIG. 8 (i.e. 1×2 bidirectional WSS, 1:2 optical coupler/splitter, and 3-port optical circulator), the exemplary architecture uses 2×2 optical switches. There are at least two types of 2×2 optical switches available in terms of the switching functions. Each switch has two switching states. FIG. 9 explains the difference and the symbol used in this document.

The first type is called "2×2 bypass switch". In the first state (called the "Bar state"), Input 1 is connected to Output 1, and Input 2 is connected to Output 2. In the second state (called the "Bypass state"), Input 2 is connected to Output 1, while Input 1 and Output 2 are not connected together. In other words, the Input 1 signal is terminated, and Output 2 receives no signal.

The second type is called "2×2 cross switch". The first state is the same "Bat state" where Input 1 is connected to Output 2, and Input 2 is connected to Output 2. The second state is called "Cross state", where Input 1 is connected to Output 2, and Input 2 is connected to Output 1.

Both types of switches allow bidirectional operation, which means that the output ports can be used as input ports, and the input ports can be used as output ports. The availability of these two types of optical switches varies, therefore our invention consider each type of switch separately.

(3) Design 1: using 2×2 Bypass Switches (3.1) ROADM Subsystem Design

Figure 10:
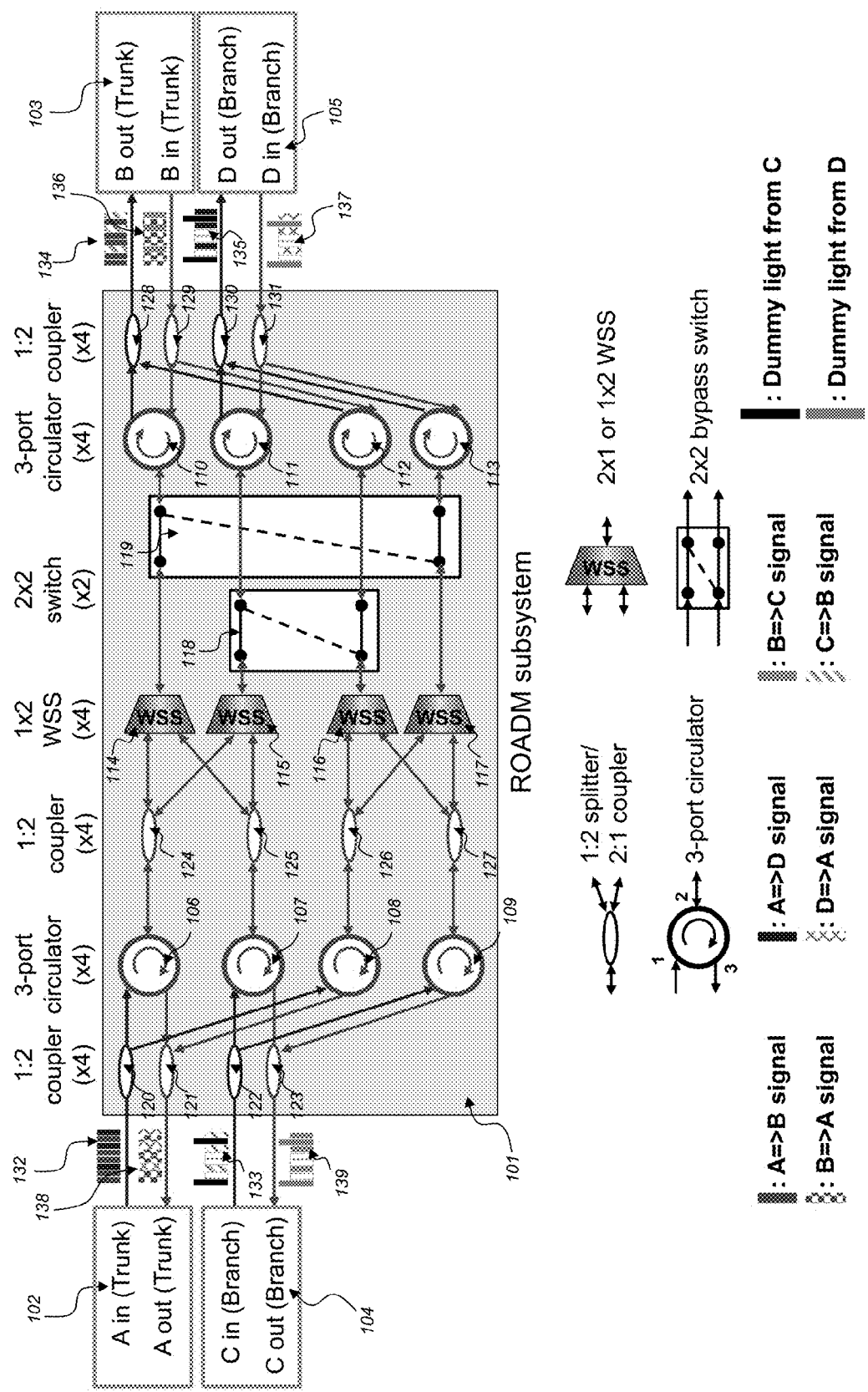
FIG. 10 shows an exemplary low cost secure ROADM subsystem with redundancy protection using 2×2 bypass switches.
Figure 11A:
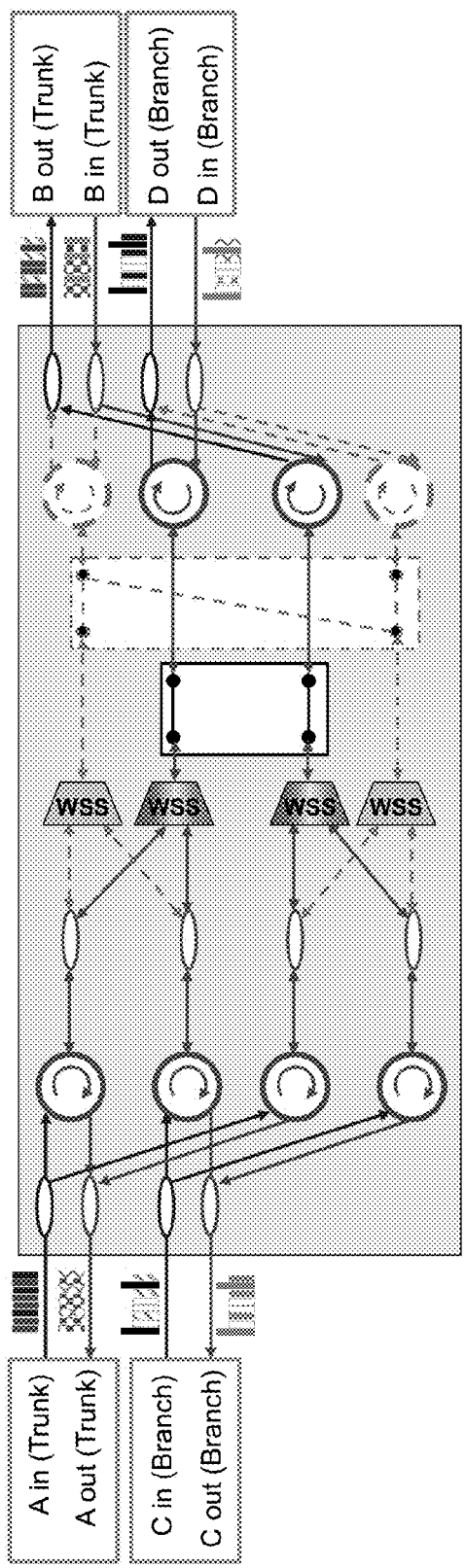
FIG. 11A-11D show exemplary working paths when one working WSS and one backup WSS fail simultaneously for ROADM subsystem with 2×2 bypass switches.
Figure 11B:
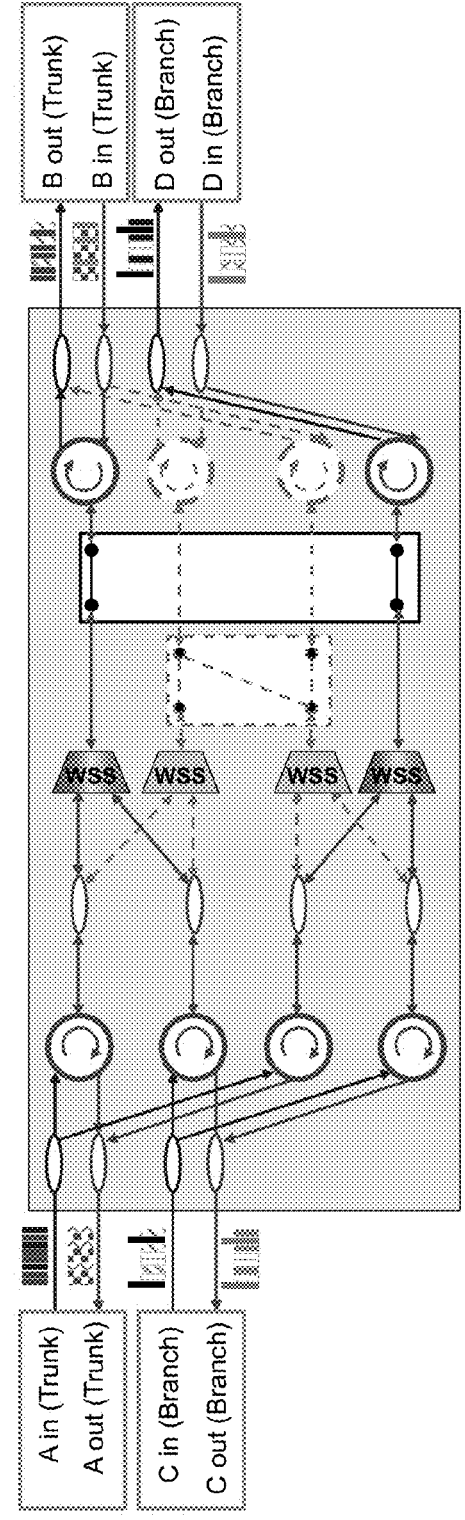
Figure 11C:
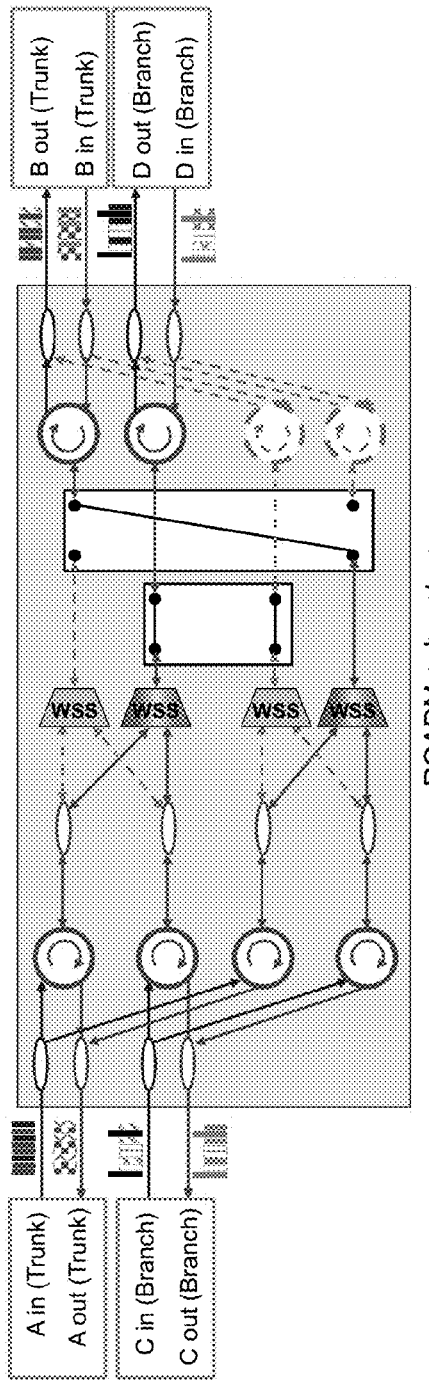
Figure 11D:
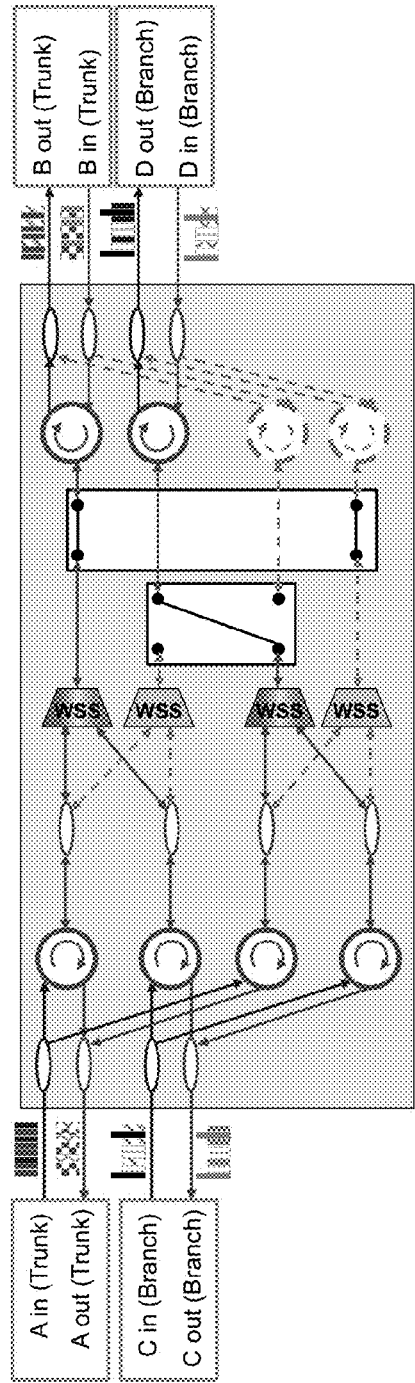

FIG. 10 is the schematic of the exemplary solution with 2×2 bypass switch (101). It serves 2 trunk terminals (A (102) and B (103)), and 2 branch terminals (C (104) and D (105)). It consists of eight 3-port optical circulators (106-113), four 2×1 WSS's (114 and 117, also operate as 1×2 WSS's), two 2×2 bypass switches (119 and 119), and twelve optical splitters/couplers (120 to 131). Since optical splitters and couplers are essentially the same device, we will refer to them as "optical couplers" or simply "couplers" in the remaining document). Each 3-port circulator passes signals from Port 1 to Port 2, and Port 2 to Port 3, while isolates/blocks signals in the reverse direction (i.e. Port 2 to Port 1, and Port 3 to Port 2). These components are interconnected through optical fiber within the ROADM subsystem. The signals for each source-destination pair are illustrated as colored and shaded bars next to the input and output fibers.

In this ROADM subsystem, there are 4 circulator-coupler-WSS-switch-circulator paths, such as circulator (106) to coupler (124) to WSS (114) to switch (119) to circulator (110). These 4 paths are in parallel, with some cross-connection in between. At any time, two of them work as the working paths, and the other two are not used (either serve as backup paths, or are failed paths). Since these 4 paths are symmetrical in terms of the function, here we assign the upper 2 paths in FIG. 10 as the working paths, and the lower 2 paths as backup paths. In reality any 2 paths can be used as working paths.

(3.2) Normal Operation

The input signal from Trunk Terminal A (102) is used as the example here. The signal (132) consists of solid filled red and blue bars, symbolizing different optical channels for different destinations. The signals going to the same destination (such as the solid red bars that are signals from Trunk Terminal A to Trunk Terminal B) do not need to be contiguous in the wavelength/frequency domain, as illustrated. When the signal (132) enters the ROADM subsystem, it is split by a 1:2 coupler (120) to two paths. One of them is for the working path, which enters the 3-port optical circulator 106, and the other is for the backup path, which enters another 3-port optical circulator 108. For the working path, the signal goes through Port 1 of the 3-port optical circulator (106), and exits Port 2 to enter the 1:2 coupler (124). The signal is again split to two paths. The first path goes to Input 1 of a 2×1 WSS (114). This WSS is configured by the controller of the ROADM subsystem according to the network's wavelength plan. It picks up only the channels intended for Trunk Terminal B (which are the solid red bars), and discards the remaining channels (the solid blue bars). Since WSS can select each individual channel to either Input 1 or Input 2 independently, all the $2^K$ configurations (where K is the number of WDM channels) can be achieved, delivering full reconfigurability.

The second path (i.e. the second output of coupler 124) is sent to Input 1 of another 2×1 WSS (115), which picks up the solid blue channels as they are intended for Branch Terminal D, and discards the solid red channels that are intended for Terminal B.

Another terminal that contains signal for Trunk Terminal B is the Branch Terminal C (104). The input signal (133) from this terminal consists of the signals for Terminal B (represented by the shaded green bars), as well as some dummy light (represented by the solid black bars), since there is no need to send signal to other terminals (i.e. A and D). This signal goes through the similar device: firstly split by 1:2 coupler 122, the first path (working path) is then enters Port 1 of circulator 107, exists Port 2, then is split by another 1:2 coupler 125 into 2 paths, one of them enters input 2 of WSS 114. As controlled by the BU controller, the WSS selects the intended channels (shaded green channels), and discards the dummy signals. At the output (Common port) of the WSS, the signal is the combination of the A=>B signal (solid red channels) and C=>B signal (shaded green channels). This combined signal goes through a 2×2 bypass switch (119), which is at the bar state. The signal enters Input 1 of the switch and exits Output 1. It then enters Port 2 of the Terminal B circulator (110) and exits Port 3, and is combined with signal from backup path (which is sent from circulator 112) through the 1:2 coupler 128. Since the backup path is not used, there is no signal arriving from circulator 112 at this moment. The combined signal (134) is sent to the output port for Trunk Terminal B (103). It contains only the intended channels, ensuring secure data delivery. Due to intelligent network planning and wavelength assignment, there are no wavelength contention between the A=>B channels and C=>B channels.

The second output of the coupler 125 enters Input 2 of 2×1 WSS 115, which filters out the shaded green channels, and keeps the dummy light. The output (Common port) of the WSS consists of the combination of the A=>D signals (solid blue channels) and dummy light from C. This signal passes through 2×2 bypass switch (118), which is at the bar state. The signal enters Input 1 of the switch and exits Output 1. It then enters Port 2 of the circulator 111 and exits Port 3, and is then combined with backup path signal from circulator 113 (which does not contain any signal during normal operation) through 1:2 coupler 130. The combined signal 135 is sent to Branch Terminal D (105). No unintended signal goes to Terminal D, and the dummy light from Terminal C is reused to maintain power balance in the submarine link between the branching unit and Terminal D.

Similar operation is performed for the signals from B and from D, but in the opposite way (red arrows). The signal from B (136) is split into working and backup paths by 1:2 coupler 129. The working path is then sent through circulator 110 (Port 1 to Port 2) and the bar-state 2×2 bypass switch 119 to WSS 114, which now behaves as a 1×2 WSS. The signal intended for Trunk Terminal A (represented by the checked red bars) and the signals intended for Branch Terminal C (represented by the solid green bars) are separated by the WSS at 2 different outputs.

At the same time, the signal 137 from Terminal D (105) is split into working and backup paths by 1:2 coupler 131. The working path is then sent through circulator 111 (Port 1 to Port 2) and the bar-state 2×2 bypass switch 118 to WSS 115, which separated it into two parts, one consists of signal intended for Terminal A (represented by the crossed blue bars), and the other consists of dummy light (represented by the shaded black bars). Through the fiber cross-connection, the signals from these two WSS's intended for Trunk Terminal A (i.e. the checked red channels, and crossed blue channels) are combined by coupler 124, which now behaves as a 2:1 coupler, and sent through circulator 106 (Port 2 to Port 3) to the output 1:2 coupler 121. The coupler 121 combines this working path signal with the signal from backup path (which is from circulator 108 and contains no signal during normal operation), and send the combined signal (138) to the intended destination Terminal A (102).

Simultaneously, the solid green signals from Output 2 of WSS 114 intended for Branch Terminal C is combined with the reused dummy light from Terminal D (Output 2 of WSS 115) by 1:2 coupler 125, and sent to through circulator 107 (Port 2 to Port 3). This combined working path signal is further combined with the backup path signal from circulator 109 by 1:2 coupler 123. The combined signal 139 is sent to the intended destination Terminal C (104).

Due to the symmetric wavelength assignments, both these two WSS's have the same wavelength configuration, and the two opposite direction operations of each WSS also have the same wavelength configuration. As represented in the figure, A=>B (solid red) and B=>A (checked red) paths have the same wavelength channels (let's call it Channel Group I), and A=>D (solid blue), D=>A (checked blue), B=>C (solid green), and C=>B (shaded green) paths have the same wavelength channels (let's call it Channel Group II). Channel I and Channel II are complementary in the overall channel plan. Due to this feature, these WSS's can be used simultaneously in both directions.

Figure 7:
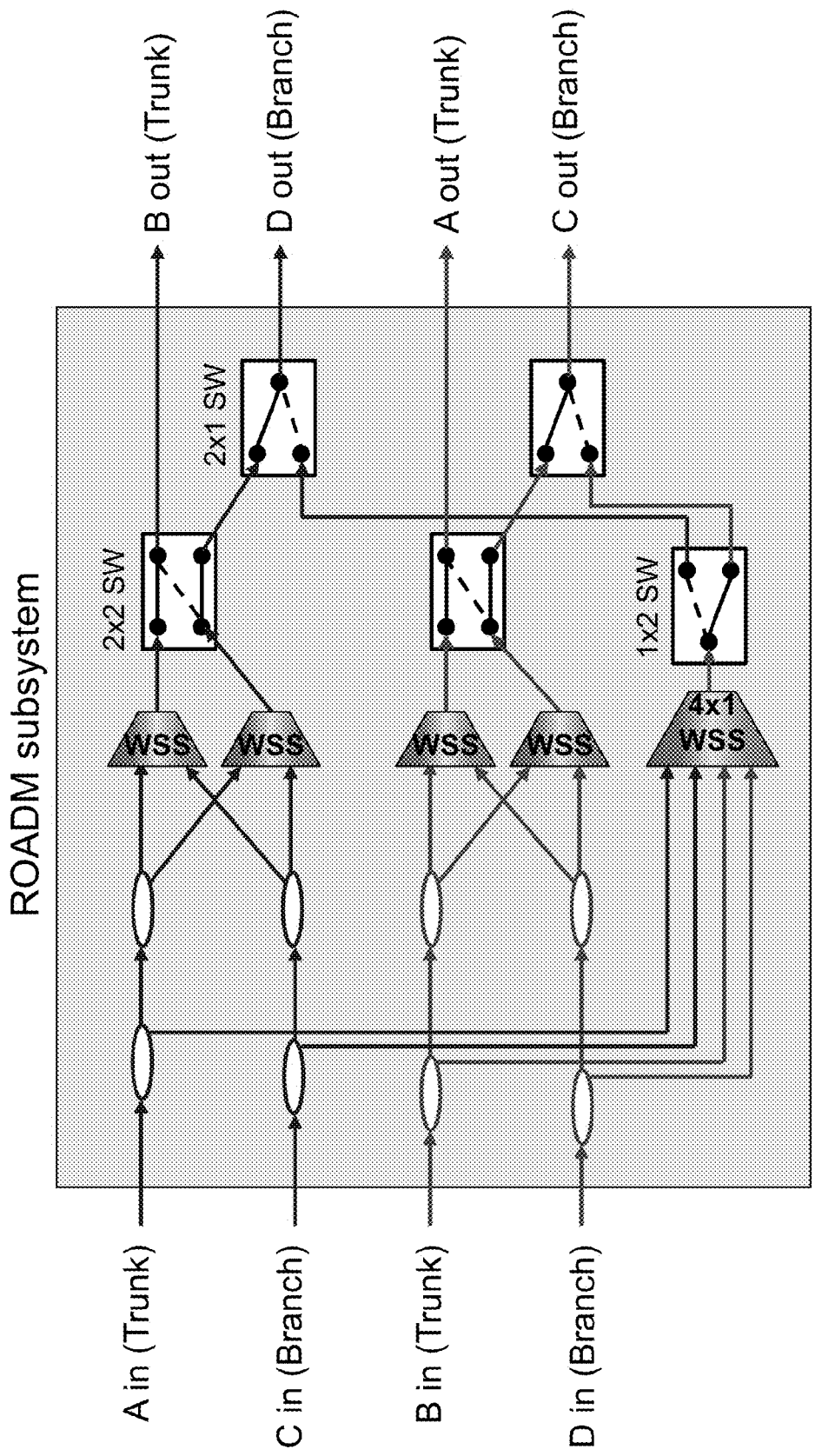
FIG. 7 shows an exemplary adding redundancy protection by 4×1 WSS

The dummy lights (filled-in channels) are used to fill in for the unused channels to maintain the set power level in the transmission link. Therefore the key requirement is the total power level, and not the number of channels or the exact wavelength/frequency. And therefore fewer channels with higher power can be used to substitute more channels with lower power, as illustrated in FIG. 7. Within the signal 115 from Branch Terminal C to the branching unit, only the shaded green channels carry useful information. For the remaining parts of the spectrum, dummy lights are used to fill in. It is not necessary to have the dummy light at each empty channel, instead fewer dummy lights (represented by the solid black bars) are used to balance the total power. These dummy lights are reused at the output links from the BU (such as 117, which reuses the dummy light from 115).

(3.3) Single WSS Failures

In case that any of the backup path WSS (116 and 117 in this example) fails, since they are not used in actual operation, the ROADM subsystem operates normally. The transmission and switching function of the BU is not affected.

If one of the working path WSS fails (say, 114), the backup paths are used. The other working WSS (115 in this example) is also switched off, while both backup WSS's (116 and 117) are turned on. WSS 116 is set to the same configuration as WSS 114, and WSS 117 is set to the same configuration as WSS 115. The respective passive components also change their roles. Here circulator 108 replaces circulator 106's function, coupler 126 replaces coupler 124's function, circulator 112 replaces circulator 110's function, circulator 109 replaced circulator 107's function, coupler 127 replaces coupler 125's function, and circulator 113 replaces circulator 111's function. The 2×2 bypass switches 118 and 119 remain at the bar state. Due to the signal splitting function by splitters 120, 122, 129 and 131, as well as signal combing function by couplers 121, 123, 128, and 130, the backup paths have the same signal as the original working path. Therefore the ROADM system operates as usual, i.e. all the ROADM functions are kept, secure data delivery is maintained for all connections, and fully reconfigurability is available. Therefore redundancy protection is achieved.

The same protection step is taken if the other working path WSS (115) fails, all the ROADM system's functions are maintained and redundancy protection is achieved.

(3.4) Simultaneous Two WSS Failures

In case that both backup path WSS (116 and 117) fail at the same time, the ROADM subsystem's function and operation is not affected.

In case that both working path WSS (114 and 115) fail at the same time, the protection step for single WSS failure described above (section 3.3) can be applied, and all ROADM functions with secure data delivery are maintained.

There are 4 combinations when one of the working path WSS and one of the backup path WSS fail simultaneously:

(3.4.a)

If working path WSS 114 and backup path WSS 117 fail at the same time, backup path WSS 116 is turned on and configured with the original configuration of WSS 114. The 2×2 bypass switch 118 remains at the bar state, and the other 2×2 bypass switch 119 is not used (so can be at any state). The signals from Terminal A to Terminal B will go through splitter 120 and take the backup path. They pass through circulator 108 and splitter 126, and reach Input 1 of WSS 116. At the same time, the signals from Terminal C to Terminal B also go through the splitter 122 and take the backup path. They pass through circulator 109 and splitter 127, and reach Input 2 of WSS 116. The WSS 116 combines them appropriately according to network channel assignment to form the output signal for Terminal B. This combined signal passes through 2×2 switch 118 (Input 2 to Output 2), and reaches Terminal B through circulator 112 and coupler 128.

The signals from Terminal B to Terminal A and the signals from Terminal B to Terminal C travel in the opposite direction.

There is no change for the other signals (from Terminal A to Terminal D, from Terminal C to Terminal D, from Terminal D to Terminal A, and from Terminal D to Terminal C), the same light paths and operations as the normal condition (section 3.2 above) are used.

(3.4.b)

If working path WSS 115 and backup path WSS 116 fail at the same time, similar operation as in (3.4.a) is performed to achieve protection. As illustrated in FIG. 11(*b*), backup WSS 117 is turned on and configured with the original configuration of WSS 115. 2×2 bypass switch 119 is kept at the bar state. The other 2×2 bypass switch (118), circulators 111, and circulator 112 are not used. All ROADM functions with secure data delivery are maintained.

(3.4.c)

If working path WSS 114 and backup path WSS 116 fail at the same time, path WSS 117 is turned on and configured with the original configuration of WSS 114. The signals from Terminal A to Terminal B will go through splitter 120 and take the backup path. They pass through circulator 108 and splitter 126, and reach Input 1 of WSS 117. At the same time, the signals from Terminal C to Terminal B also go through the splitter 122 and take the backup path. They pass through circulator 109 and splitter 127, and reach Input 2 of WSS 117. The WSS 117 combines them appropriately according to network channel assignment to form the output signal for Terminal B. This combined signal passes through 2×2 switch 119, which is at the bypass state (Input 2 to Output 1), and reaches Terminal B through circulator 110 and coupler 128.

The signals from Terminal B to Terminal A and the signals from Terminal B to Terminal C travel in the opposite direction.

There is no change for the other signals (from Terminal A to Terminal D, from Terminal C to Terminal D, from Terminal D to Terminal A, and from Terminal D to Terminal C), the same light paths and operations as the normal condition (section 3.2 above) are used. The 2×2 bypass switch 118 remains at the bar state.

FIG. 11(*c*) illustrates the new working paths (the unused paths are shown in gray dashes). All ROADM functions with secure data delivery are maintained.

(3.4.d)

If working path WSS 115 and backup path WSS 117 fail at the same time, similar operation as in (3.4.c) is performed to achieve protection. As illustrated in FIG. 11(*d*), backup WSS 116 is turned on and configured with the original configuration of WSS 115. 2×2 bypass switch 118 is switched to the bypass state, and the other 2×2 bypass switch (119) remains at the bar state. All ROADM functions with secure data delivery are maintained.

(4) Design 2: Using 2×2 Cross Switches

Figure 12:
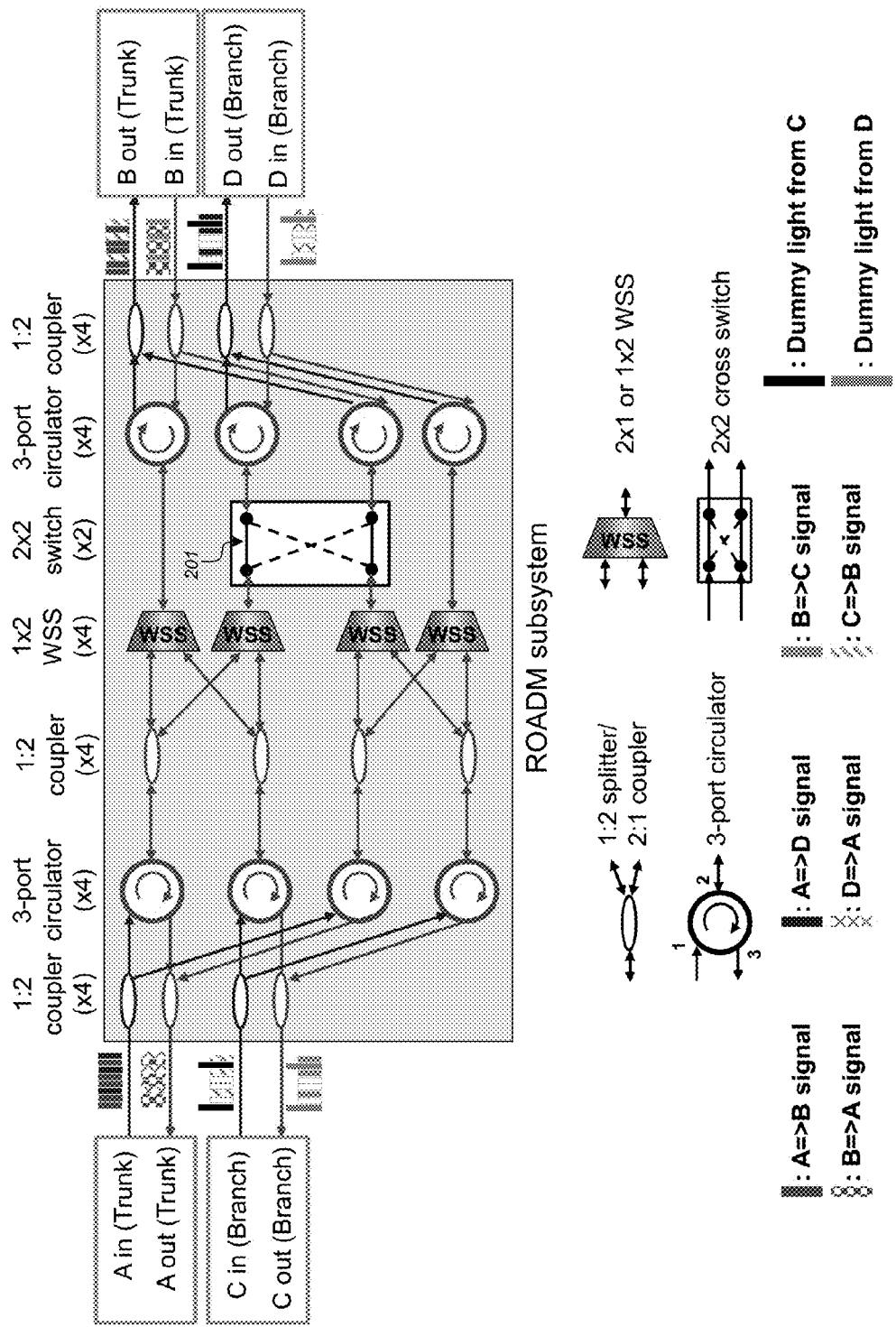
FIG. 12 shows an exemplary low cost secure ROADM subsystem with redundancy protection using 2×2 cross switch.

If 2×2 cross switch is available, the number of 2×2 switches can be reduced from 2 to 1, as illustrated in FIG. 12. The 2×2 cross switch (201) is inserted between the "WSS 115 to circulator 111" link and the "WSS 116 to circulator 112" link (following the notation on FIG. 10, same for below).

Figure 13:
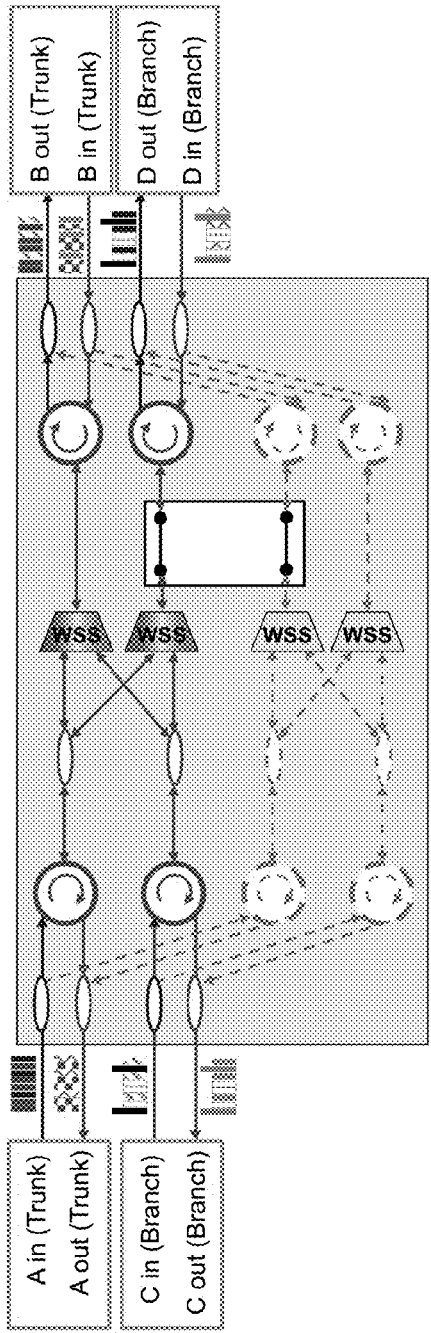
FIG. 13 shows exemplary normal working paths for ROADM subsystem with 2×2 cross switch.

We still assume WSS 114 and WSS 115 are for working paths, therefore WSS 116 and WSS 117 serve as backup and not used in the normal operation. During the normal operation, the 2×2 cross switch 201 is switched at the bar state. The operation and light paths of the ROADM subsystem are essentially the same as the ROADM subsystem with 2×2 bypass switches described in (3.2). The working paths are illustrated in FIG. 13, where the unused devices and paths are shown in gray dashes. The same setting also covers the situation where either one or both backup WSS's (116 and 117) fail. This ROADM subsystem provides full ROADM functions with secure data delivery in all paths.

Figure 14:
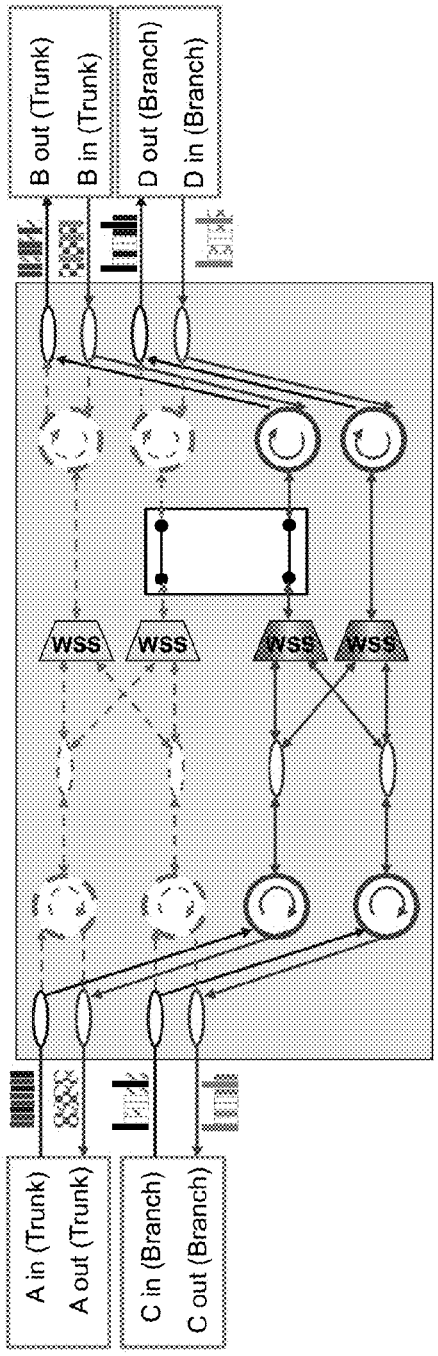
FIG. 14 shows exemplary new working paths when both working path WSS's fail simultaneously for ROADM subsystem with 2×2 cross switch.
Figure 15A:
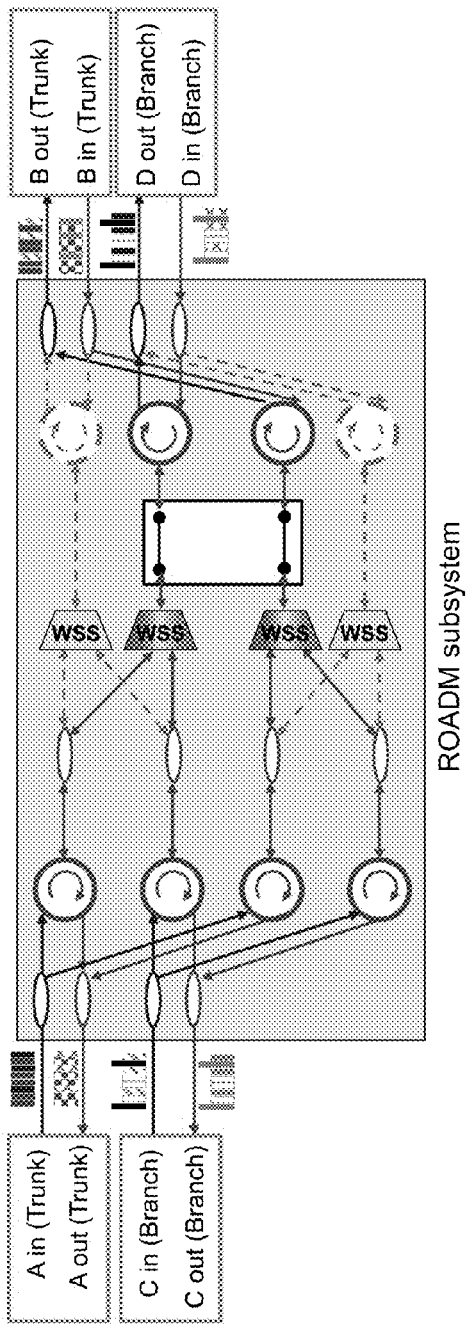
FIG. 15A-15D shows exemplary new working paths when one working WSS and one backup WSS fail simultaneously for ROADM subsystem with 2×2 cross switch.
Figure 15B:
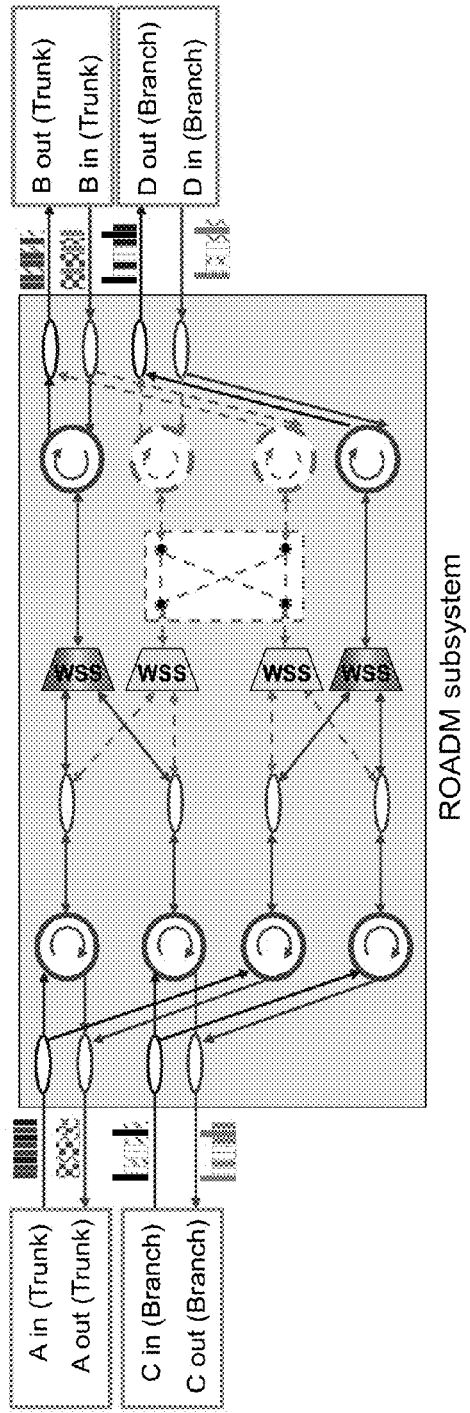
Figure 15C:
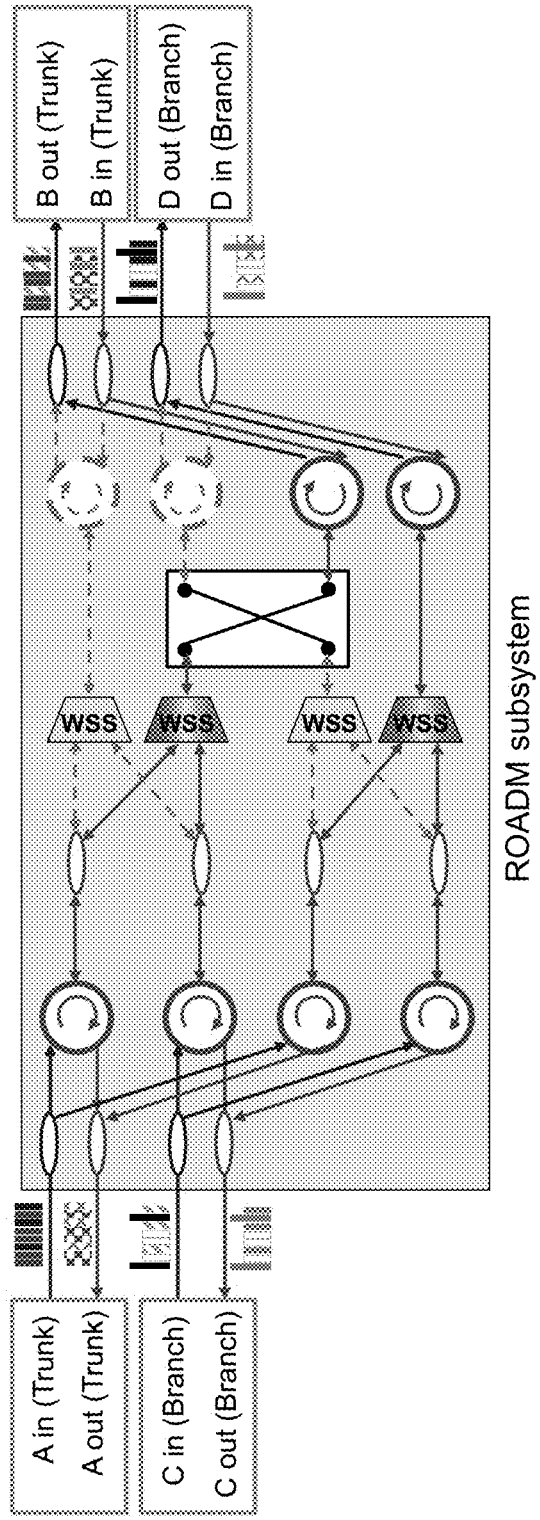
Figure 15D:
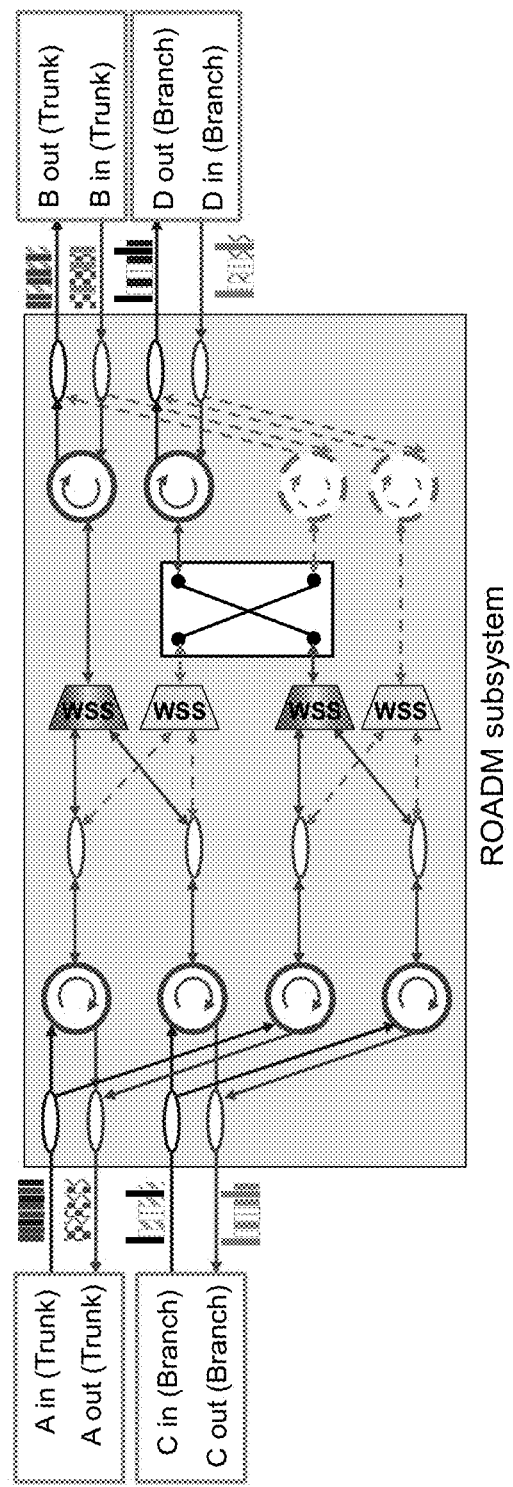

If either one or both working path WSS's (114 and 115) fail, the backup WSS's (116 and 117) are turned on. The 2×2 cross switch remains at the bar state. The new working paths are illustrated in FIG. 14.

If one of the original working path WSS and one of the backup path WSS fail at the same time, there are 4 combinations (4 cases). An appropriate backup WSS is turned on to provide the protection. The new working paths for each case are shown in FIG. 15(*a*) to (d) respectively.

It can be observed that the 2×2 cross switch (201) remains at the bar state when both WSS 114 and WSS 117 fail. If both WSS 115 and WSS 116 fail, no light passes through the 2×2 cross switch, therefore its state is irrelevant. For the other 2 cases (both WSS 114 and WSS 116 fail, and both WSS 115 and WSS 117 fail), the 2×2 cross switch is switched to the cross state.

It can also be noticed that in the case when both WSS 115 and WSS 117 fail (FIG. 15(*c*)), the WSS 115 is configured to combine traffics for Terminal B, while in all other cases where WSS 115 is operational (including the normal working case), it is configured to combine traffics for Terminal D.

(5) Comparison and Summary

Comparing both ROADM subsystem designs, the one using 2×2 cross switch has several advantages: firstly, it reduces the number of 2×2 switches to one; furthermore, there is no insertion loss between WSS 114 and circulator 110, and there is no insertion loss between WSS 117 and circulator 113, because there is no optical switch in these two optical links. However since there are still insertion loss between WSS's 115/116 and circulators 111/112 due to the presence of the 2×2 switch. Therefore the optical power is not balanced among all paths. This can be easily solved by setting appropriate attenuation levels in WSS 114 and WSS 117.

For the ROADM subsystem using 2×2 bypass switch, there is no insertion loss imbalance issue. However it requires two separate 2×2 optical switches.

In summary, both exemplary ROADM subsystems use only four 1×2 WSS's, can achieve full $2^K$ reconfigurability, and provide secure data delivery in all paths. They offer redundancy protection for up to 2 simultaneous WSS failure. When any two WSS fail, all the ROADM functions and secure data delivery feature are maintained. Therefore it satisfies all the requirements described above.

Even though the addition of optical circulators will lead to higher insertion loss compared to the 3 prior arts described above, the increase of insertion loss is typically quite low (typically less than 2 dB total for each link), therefore it can be easily compensated by the optical amplifiers at the output of the BU. Another potential issue is the crosstalk from the reverse directional signal, this issue can be mitigated by using high quality optical components, such as optical circulators with high isolation figure, and WSS's with low back-reflection components. Using direct splicing or angled connectors (instead of flat end connectors) can also mitigate the back-reflection issue.

Figure 1:
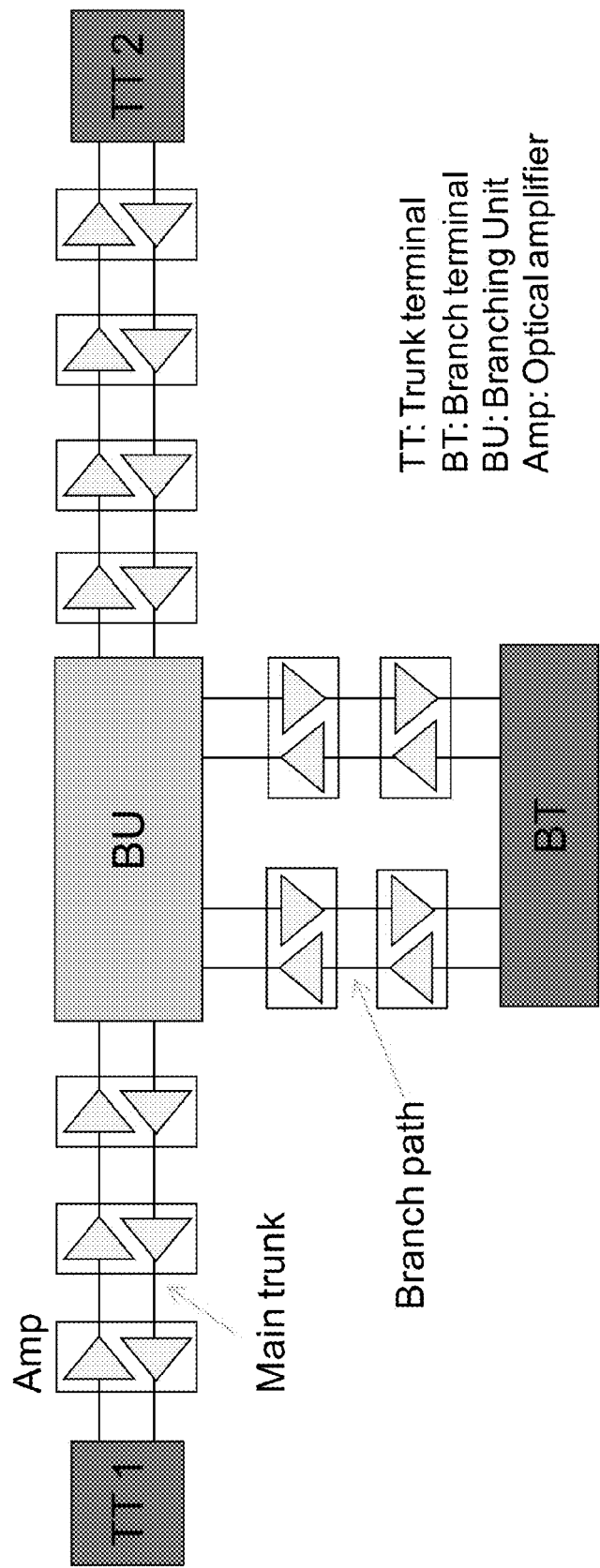
FIG. 1 shows an exemplary schematic of a submarine communication system with a BU.
Figure 2A:
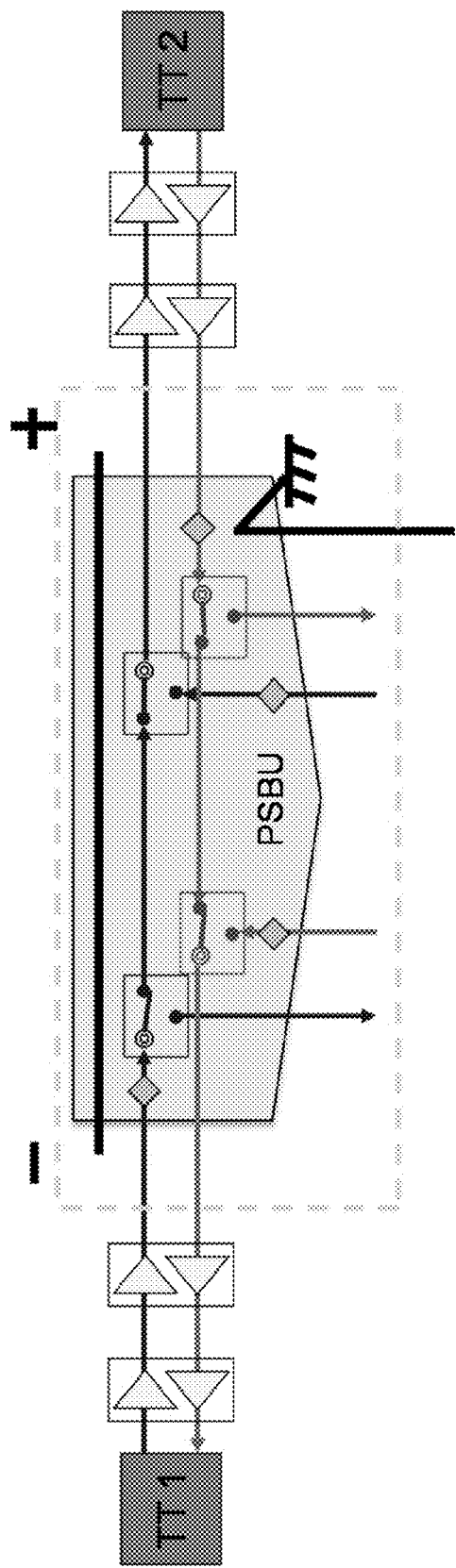
FIG. 2A shows a structure of a Branching Unit without add/drop while FIG. 2B with add/drop to branch terminal.
Figure 2B:
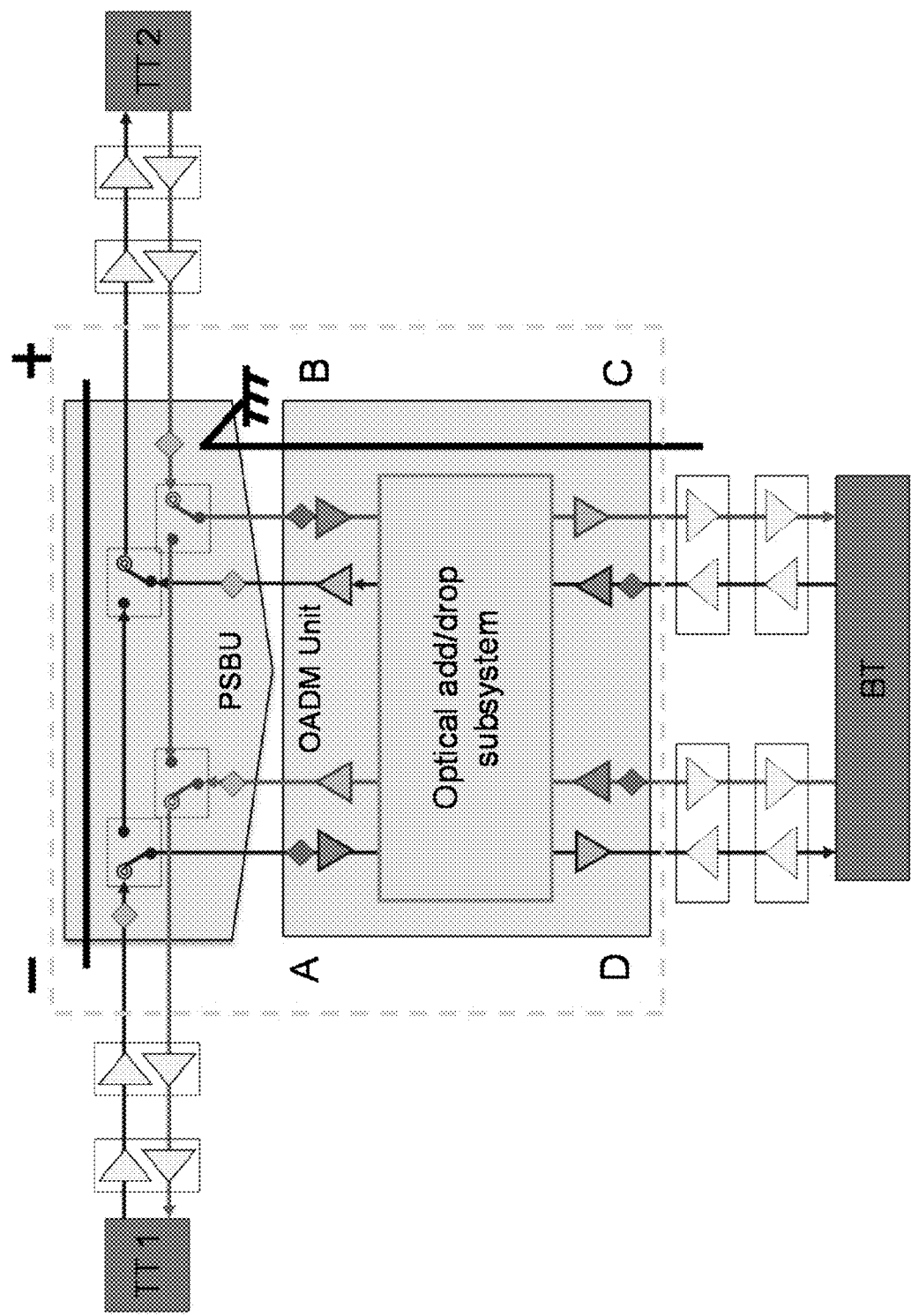
Figure 3:
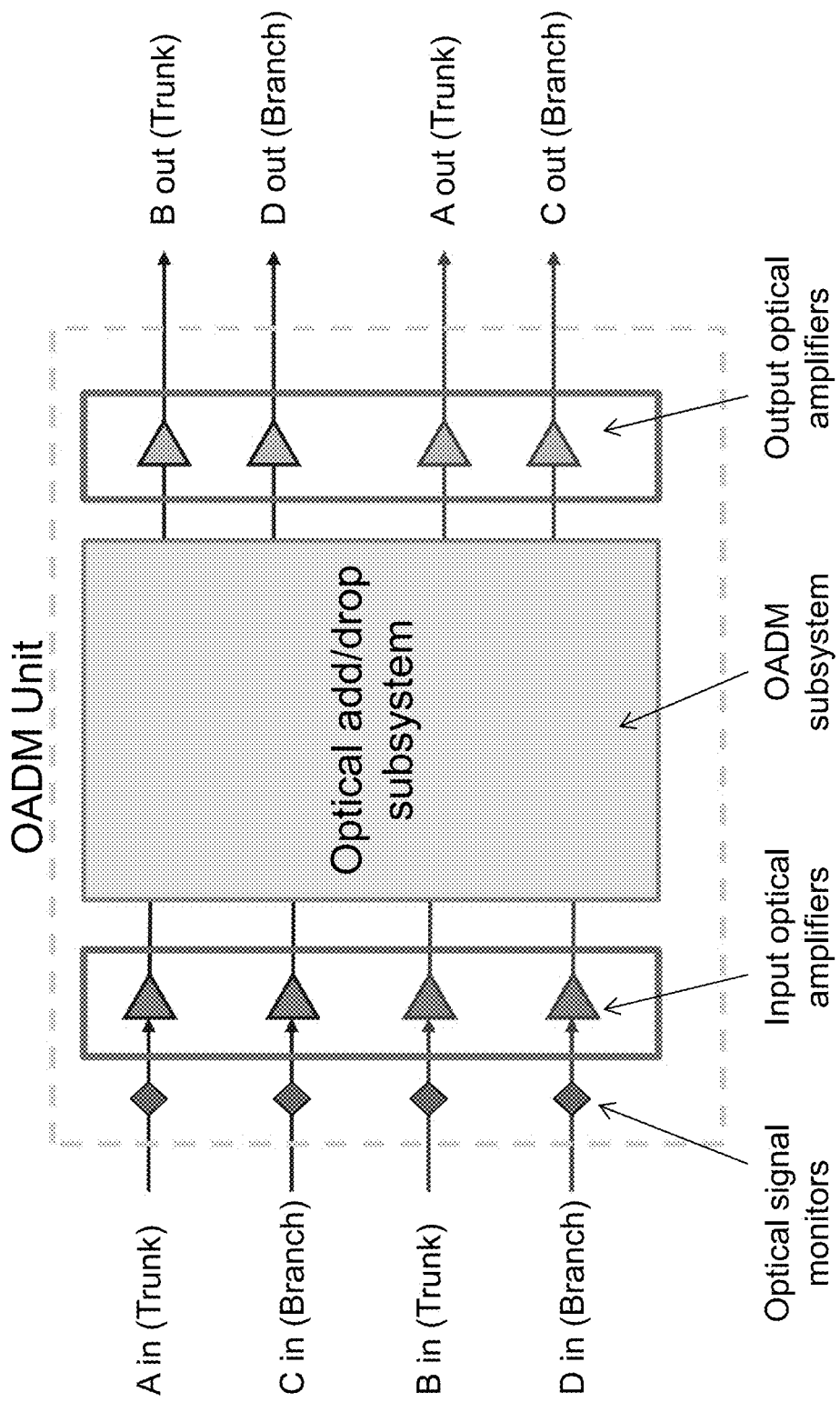
FIG. 3 shows an exemplary OADM Unit Configuration.
Figure 4:
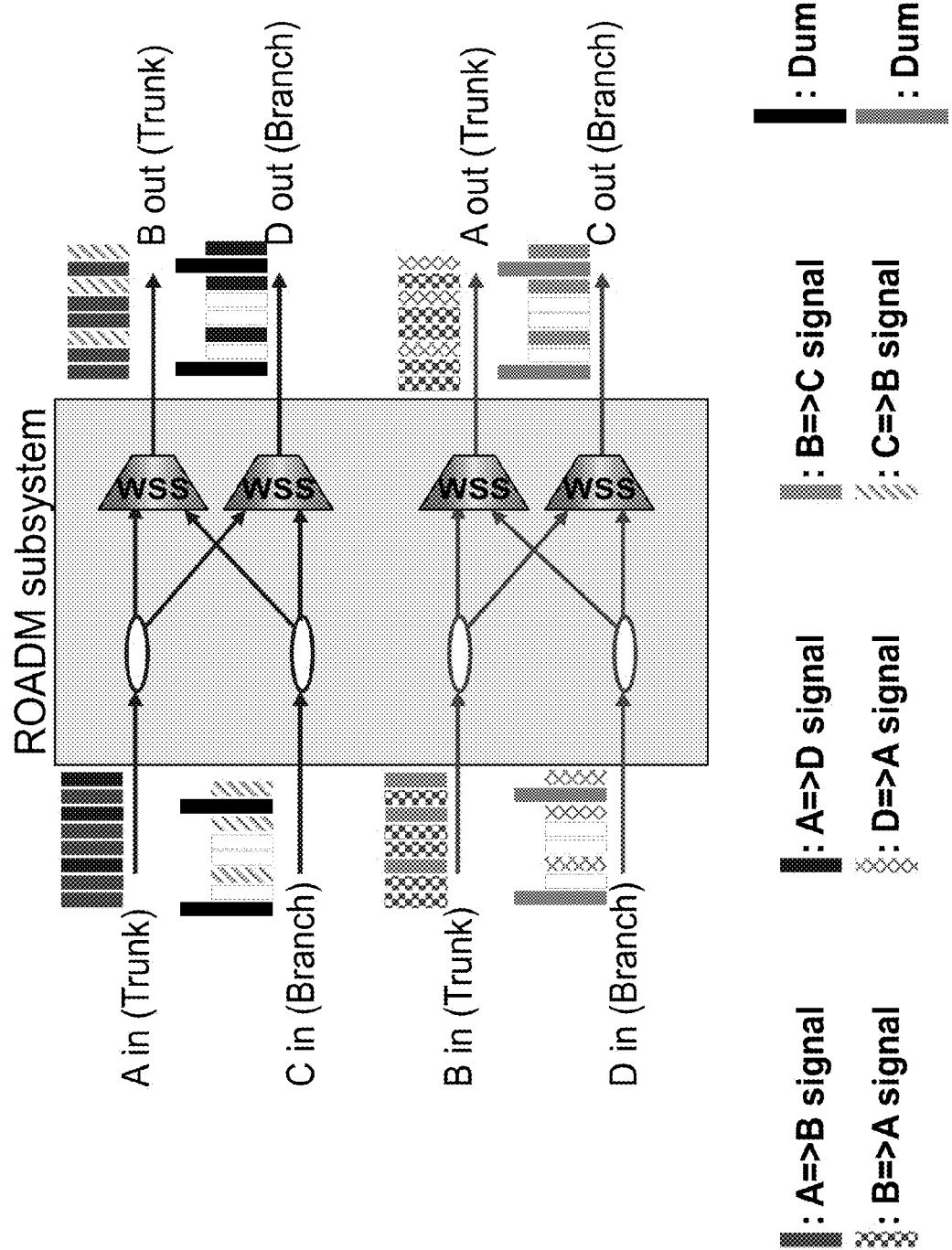
FIG. 4 shows an exemplary splitter-switch WSS-based ROADM subsystem.
Figure 5:
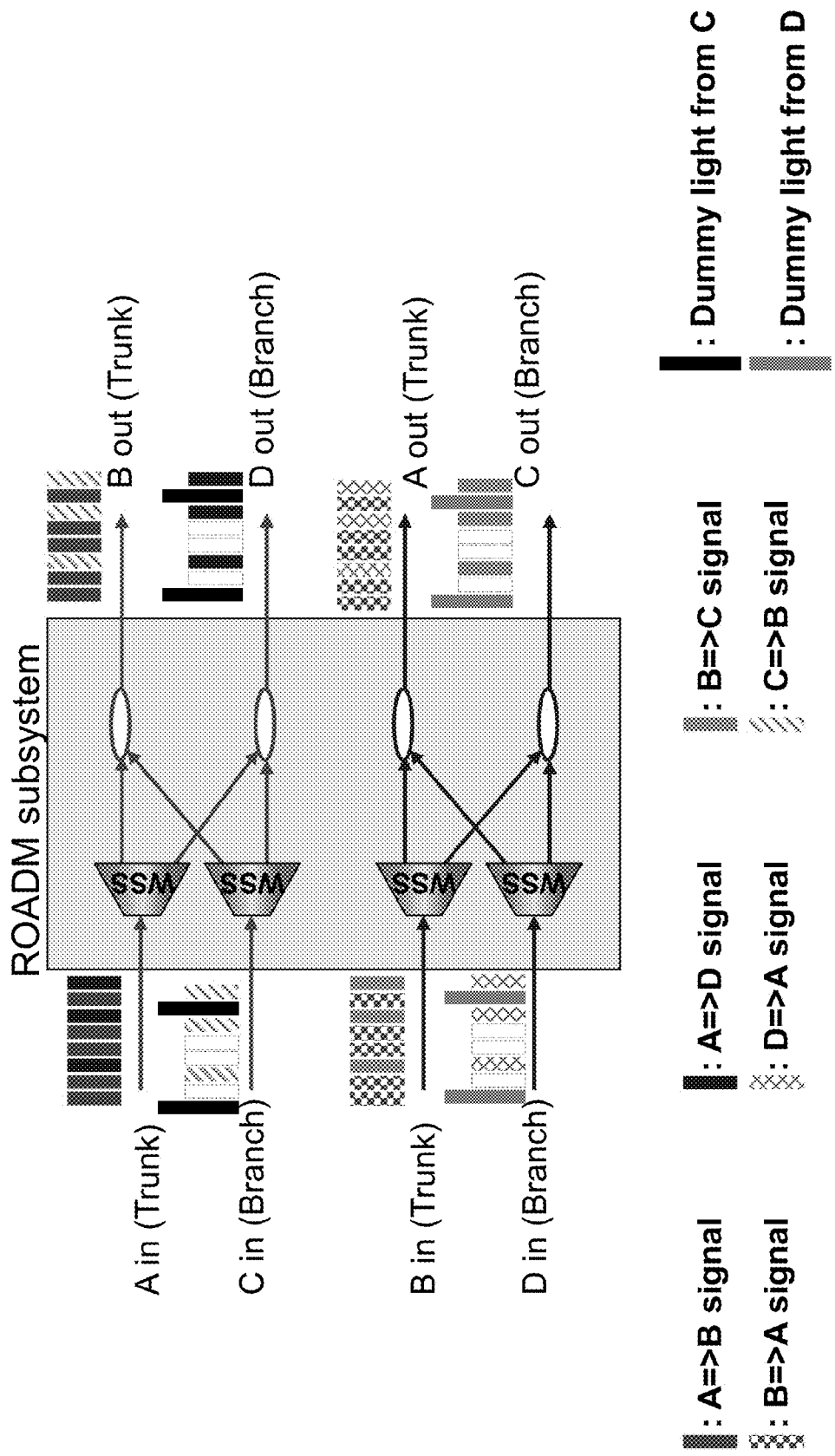
FIG. 5 shows an exemplary switch-coupler WSS-based ROADM subsystem.
Figure 6:
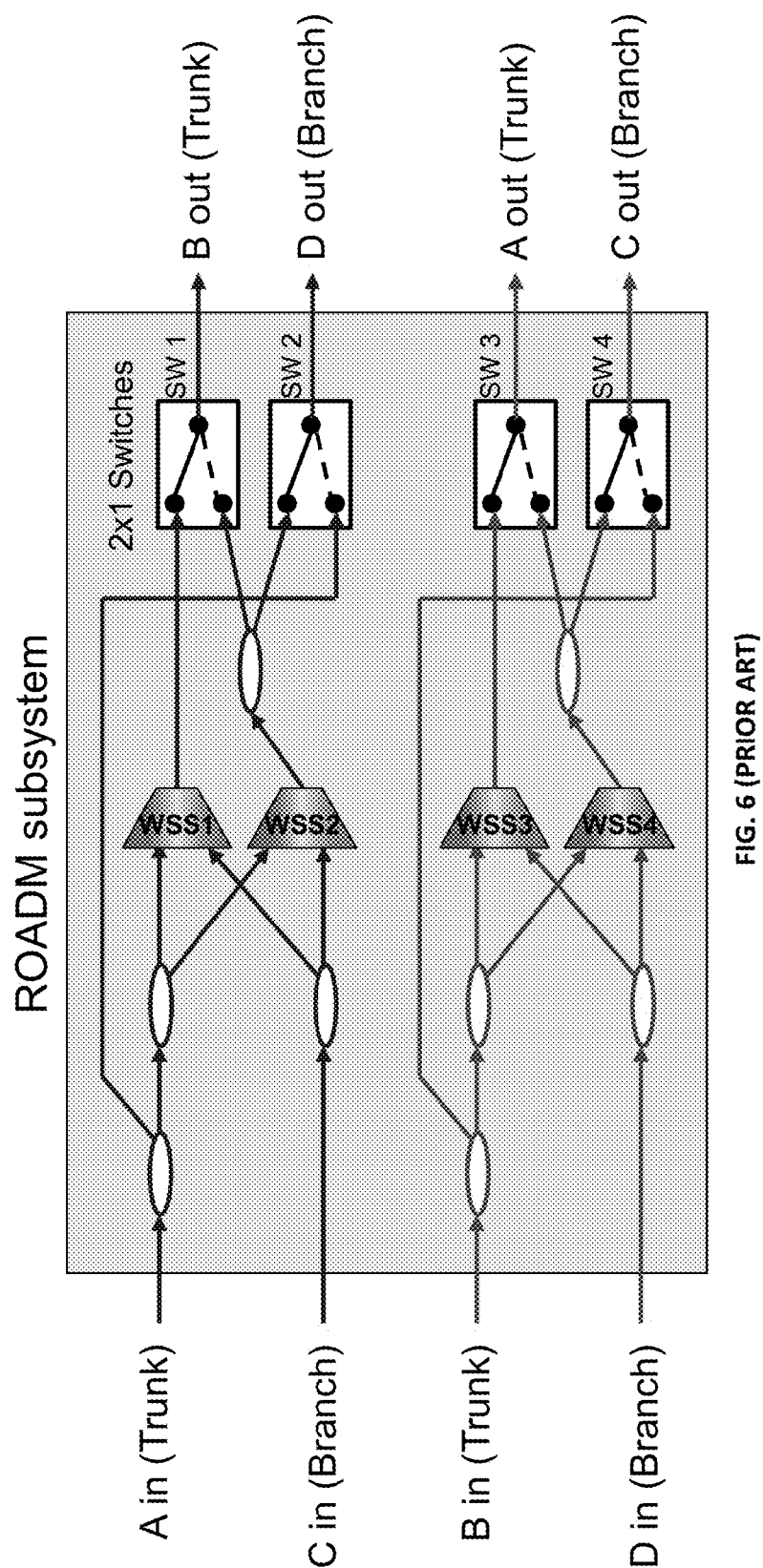
FIG. 6 shows an exemplary system adding redundancy protection by splitters and 2×1 switches.

These low cost secure ROADM subsystems with redundancy protection can be applied in submarine branching unit (as shown in FIG. 2(*b*)) to construct low cost secure ROADM branching unit with redundancy protection.

As described above in detail, the present system increases the reliability of the optical submarine branching unit having the optical path switching function and improves its transmission loss. The communication/transmission can be implemented with a simple structure.

It will be apparent to those skilled in the art that various modifications and variations can be made in the disclosed process and product without departing from the scope or spirit of the invention. For example, alternate relay placement may yield similar logical results. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A communication system, comprising:
a primary module including:
first trunk and branch input and output ports, each coupled to first in/out couplers, the first in/out couplers coupled to first circulators, and the circulators in turn coupled to first central couplers;
second trunk branch input and output ports, each coupled to second in/out couplers, each of second in/out couplers coupled to second circulators,
first and second bidirectional wavelength-selective switches (WSSes) coupled to the first central couplers; and
a secondary module including:
first trunk and branch input and output ports, each coupled to first in/out couplers, the first in/out couplers coupled to third circulators, and the circulators in turn coupled to second central couplers;
second trunk branch input and output ports, each coupled to second in/out couplers, each of second in/out couplers coupled to fourth circulators,
third and fourth bidirectional wavelength-selective switches (WSSes) coupled to the second central couplers; and
2×2 switches cross connecting the primary module WSS outputs with the secondary module WSS outputs.

2. The system of claim 1, wherein the 2×2 optical switches comprise either 2×2 bypass switches or 2×2 cross switches.

3. The system of claim 1, wherein at least one of the WSS is used in all paths to provide full reconfigurability and secure data delivery.

4. The system of claim 1, comprising circulators and the bidirectional operation of WSS's within the ROADM subsystem of a submarine branching unit to reduce hardware by half.

5. The system of claim 1, comprising a symmetric wavelength assignment module within the submarine network to provide bi-directional operations.

6. The system of claim 1, comprising a backup WSS to provide redundancy hardware and light paths.

7. The system of claim 1, comprising 2×2 optical switches and interconnections between working and backup components to enable full function during two simultaneous failures.

8. The system of claim 1, wherein the WSSes have identical first wavelength configuration in a first direction and identical second wavelength configuration in a second direction.

9. The system of claim 8, wherein the first and second wavelength configurations are complementary in a channel plan.

10. The system of claim 8, wherein the WSSes operate simultaneously in both directions.

11. A communication system, comprising:
   a primary module including:
      first trunk and branch input and output ports, each coupled to first in/out couplers, the first in/out couplers coupled to first circulators, and the circulators in turn coupled to first central couplers;
      second trunk branch input and output ports, each coupled to second in/out couplers, each of second in/out couplers coupled to second circulators,
      first and second bidirectional wavelength-selective switches (WSSes) coupled to the first central couplers; and
   a secondary module including:
      first trunk and branch input and output ports, each coupled to first in/out couplers, the first in/out couplers coupled to third circulators, and the circulators in turn coupled to second central couplers;
      second trunk branch input and output ports, each coupled to second in/out couplers, each of second in/out couplers coupled to fourth circulators,
      third and fourth bidirectional wavelength-selective switches (WSSes) coupled to the second central couplers; and
      a single 2×2 cross switch connecting the primary module WSS outputs with the secondary module WSS outputs.

12. The system of claim 11, wherein at least one of the WSS is used in all paths to provide full reconfigurability and secure data delivery.

13. The system of claim 11, comprising circulators and the bidirectional operation of WSS's within the ROADM subsystem of a submarine branching unit to reduce hardware by half.

14. The system of claim 11, comprising a symmetric wavelength assignment module within the submarine network to provide bi-directional operations.

15. The system of claim 11, comprising a backup WSS to provide redundancy hardware and light paths.

16. The system of claim 11, comprising 2×2 optical switches and interconnections between working and backup components to enable full function during two simultaneous failures.

17. The system of claim 11, wherein the WSSes have identical first wavelength configuration in a first direction and identical second wavelength configuration in a second direction.

18. The system of claim 17, wherein the first and second wavelength configurations are complementary in a channel plan.

19. The system of claim 17, wherein the WSSes operate simultaneously in both directions.

20. A communication system, comprising:
   a primary module including:
      first trunk and branch input and output ports, each coupled to first in/out couplers, the first in/out couplers coupled to first circulators, and the circulators in turn coupled to first central couplers;
      second trunk branch input and output ports, each coupled to second in/out couplers, each of second in/out couplers coupled to second circulators,
      first and second bidirectional wavelength-selective switches (WSSes) coupled to the first central couplers; and
   a secondary module including:
      first trunk and branch input and output ports, each coupled to first in/out couplers, the first in/out couplers coupled to third circulators, and the circulators in turn coupled to second central couplers;
      second trunk branch input and output ports, each coupled to second in/out couplers, each of second in/out couplers coupled to fourth circulators,
      third and fourth bidirectional wavelength-selective switches (WSSes) coupled to the second central couplers; and
      one or more 2×2 switches coupling the primary module WSS outputs with the secondary module WSS outputs.

* * * * *